(12) United States Patent
Naples et al.

(10) Patent No.: US 10,838,484 B2
(45) Date of Patent: Nov. 17, 2020

(54) VISUAL AURA AROUND FIELD OF VIEW

(71) Applicant: Magic Leap, Inc., Plantation, FL (US)

(72) Inventors: Alysha Naples, Ft. Lauderdale, FL (US); Jonathan Lawrence Mann, Seattle, WA (US); Paul Armistead Hoover, Bothell, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/491,571

(22) Filed: Apr. 19, 2017

(65) Prior Publication Data

US 2017/0309079 A1 Oct. 26, 2017

Related U.S. Application Data

(60) Provisional application No. 62/325,685, filed on Apr. 21, 2016.

(51) Int. Cl.
*G06F 3/01* (2006.01)
*G06K 9/00* (2006.01)
*G06F 3/0481* (2013.01)

(52) U.S. Cl.
CPC .............. *G06F 3/011* (2013.01); *G06F 3/012* (2013.01); *G06F 3/013* (2013.01); *G06F 3/04815* (2013.01); *G06K 9/0061* (2013.01); *G06K 9/00671* (2013.01)

(58) Field of Classification Search
CPC .............................. G06F 3/011; G06K 9/0061
See application file for complete search history.

(56) References Cited

U.S. PATENT DOCUMENTS

| | | |
|---|---|---|
| 6,532,007 B1 | 3/2003 | Matsuda |
| 6,850,221 B1 | 2/2005 | Tickle |
| D514,570 S | 2/2006 | Ohta |
| 7,834,846 B1 | 11/2010 | Bell |
| 8,458,603 B2 | 6/2013 | Finn et al. |
| 8,466,931 B2 | 6/2013 | Finn et al. |
| 8,950,867 B2 | 2/2015 | Macnamara |
| 9,064,023 B2 | 6/2015 | Hyndman |
| 9,081,426 B2 | 7/2015 | Armstrong |
| 9,176,579 B2 | 11/2015 | Hyndman et al. |

(Continued)

FOREIGN PATENT DOCUMENTS

| | | |
|---|---|---|
| EP | 2 767 953 | 8/2014 |
| WO | WO 2015/192117 | 12/2015 |
| WO | WO 2017/184694 | 10/2017 |

OTHER PUBLICATIONS

International Search Report and Written Opinion for PCT Application No. PCT/US2017/028297, dated Jun. 29, 2017.

(Continued)

*Primary Examiner* — Yi Yang
(74) *Attorney, Agent, or Firm* — Knobbe, Martens, Olson & Bear, LLP

(57) ABSTRACT

A wearable device can have a field of view through which a user can perceive real or virtual objects. The device can display a visual aura representing contextual information associated with an object that is outside the user's field of view. The visual aura can be displayed near an edge of the field of view and can dynamically change as the contextual information associated with the object changes, e.g., the relative position of the object and the user (or the user's field of view) changes.

27 Claims, 19 Drawing Sheets

(56) References Cited

U.S. PATENT DOCUMENTS

| | | | |
|---|---|---|---|
| 9,215,293 B2 | 12/2015 | Miller | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 2005/0275626 A1* | 12/2005 | Mueller | H05B 37/0245 345/156 |
| 2010/0177117 A1 | 7/2010 | Finn et al. | |
| 2010/0240988 A1* | 9/2010 | Varga | G02B 27/017 600/425 |
| 2011/0063286 A1 | 3/2011 | Roberts et al. | |
| 2012/0127062 A1 | 5/2012 | Bar-Zeev et al. | |
| 2013/0082922 A1 | 4/2013 | Miller | |
| 2013/0104085 A1 | 4/2013 | Mlyniec et al. | |
| 2013/0117377 A1* | 5/2013 | Miller | H04L 67/38 709/205 |
| 2013/0125027 A1 | 5/2013 | Abovitz | |
| 2013/0285885 A1 | 10/2013 | Nowatzyk et al. | |
| 2014/0002351 A1* | 1/2014 | Nakayama | G06F 3/012 345/156 |
| 2014/0003762 A1 | 1/2014 | Macnamara | |
| 2014/0071539 A1 | 3/2014 | Gao | |
| 2014/0129990 A1* | 5/2014 | Xin | G06F 3/017 715/849 |
| 2014/0177023 A1 | 6/2014 | Gao et al. | |
| 2014/0218468 A1 | 8/2014 | Gao et al. | |
| 2014/0306866 A1 | 10/2014 | Miller et al. | |
| 2014/0320389 A1 | 10/2014 | Scavezze et al. | |
| 2014/0364212 A1* | 12/2014 | Osman | A63F 13/213 463/31 |
| 2014/0375683 A1* | 12/2014 | Salter | G06F 3/013 345/633 |
| 2015/0016777 A1 | 1/2015 | Abovitz et al. | |
| 2015/0091941 A1 | 4/2015 | Das et al. | |
| 2015/0091943 A1* | 4/2015 | Lee | G02B 27/0172 345/633 |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0221115 A1* | 8/2015 | Matsubara | G06T 11/60 345/633 |
| 2015/0222883 A1 | 8/2015 | Welch | |
| 2015/0222884 A1 | 8/2015 | Cheng | |
| 2015/0262424 A1 | 9/2015 | Tabaka et al. | |
| 2015/0268415 A1 | 9/2015 | Schowengerdt et al. | |
| 2015/0302652 A1 | 10/2015 | Miller et al. | |
| 2015/0304645 A1* | 10/2015 | Wilson | G06F 3/011 348/51 |
| 2015/0326570 A1 | 11/2015 | Publicover et al. | |
| 2015/0341626 A1* | 11/2015 | Kim | H04N 21/816 348/51 |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0027218 A1* | 1/2016 | Salter | G02B 27/0172 345/633 |
| 2016/0055676 A1 | 2/2016 | Kashara et al. | |

OTHER PUBLICATIONS

Maimone, A. et al., "Computational Augmented Reality Eyeglasses", 2013 IEEE International Symposium on Mixed and Augmented Reality, 2013, in 10 pages. URL: https://pdfs.semanticscholar.org/31cf/7b9bbc9199b0432483789ec65d81e64e4ddc.pdf.

"Field of view", Wikipedia, retrieved Nov. 1, 2015, in 5 pages. URL: https://en.wikipedia.org/wiki/Field_of_view.

"Simultaneous localization and mapping", Wikipedia, accessed Oct. 22, 2015, in 7 pages. URL: https://en.wikipedia.org/wiki/Simultaneous_localization_and_mapping.

International Preliminary Report on Patentability for PCT Application No. PCT/US2017/028297, dated Oct. 23, 2018.

European Extended Search Report, re EP Application No. 17786528.4, dated Sep. 24, 2019.

* cited by examiner

VISUAL AURA AROUND FIELD OF VIEW

CROSS-REFERENCE TO RELATED APPLICATIONS

This application claims the benefit of priority under 35 U.S.C. § 119(e) to U.S. Provisional Application No. 62/325,685, filed on Apr. 21, 2016, entitled "RENDERING AURAS FOR OBJECTS IN AN AUGMENTED OR VIRTUAL REALITY ENVIRONMENT," which is hereby incorporated by reference herein in its entirety.

FIELD

The present disclosure relates to virtual reality and augmented reality imaging and visualization systems and more particularly to informing users of objects in an environment.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY OF THE INVENTION

In one embodiment, a system for providing an indication of an interactable object in a three-dimensional (3D) environment of a user is disclosed. The system can comprise a display system of a wearable device configured to present a three-dimensional view to a user and permit a user interaction with objects in a field of regard (FOR) of a user. The FOR can comprise a portion of the environment around the user that is capable of being perceived by the user via the display system. The system can also comprise a sensor configured to acquire data associated with a pose of the user and a hardware processor in communication with the sensor and the display system. The hardware processor can be programmed to: determine a pose of the user based on the data acquired by the sensor; determine a field of view (FOV) of the user based at least partly on the pose of the user, the FOV comprising a portion of the FOR that is capable of being perceived at a given time by the user via the display system; identify an interactable object located outside of the FOV of the user; access contextual information associated with the interactable object; determine a visual representation of an aura based on the contextual information; and render the visual representation of the aura such that at least a portion of the visual aura perceivable by the user is on an edge of the FOV of the user.

In another embodiment, a method for providing an indication of an interactable object in a three-dimensional (3D) environment of a user is disclosed. The method may be performed under control of a wearable device having a display system configured to present a three-dimensional (3D) view to a user and permit a user interaction with objects in a field of regard (FOR) of a user where the FOR can comprise a portion of the environment around the user that is capable of being perceived by the user via the display system; a sensor configured to acquire data associated with a pose of the user; and a hardware processor in communication with the sensor and the display system. The method can comprise: determining a field of view (FOV) of the user based at least partly on the pose of the user, the FOV comprising a portion of the FOR that is capable of being perceived at a given time by the user via the display system; identifying an interactable object located outside of the FOV of the user; accessing contextual information associated with the interactable object; determining a visual representation of an aura based on the contextual information; and rendering the visual representation of the aura such that at least a portion of the visual aura perceivable by the user is on an edge of the FOV of the user.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 13 schematically illustrates an example of informing the user of an object in the user's FOR.

Figure 1:
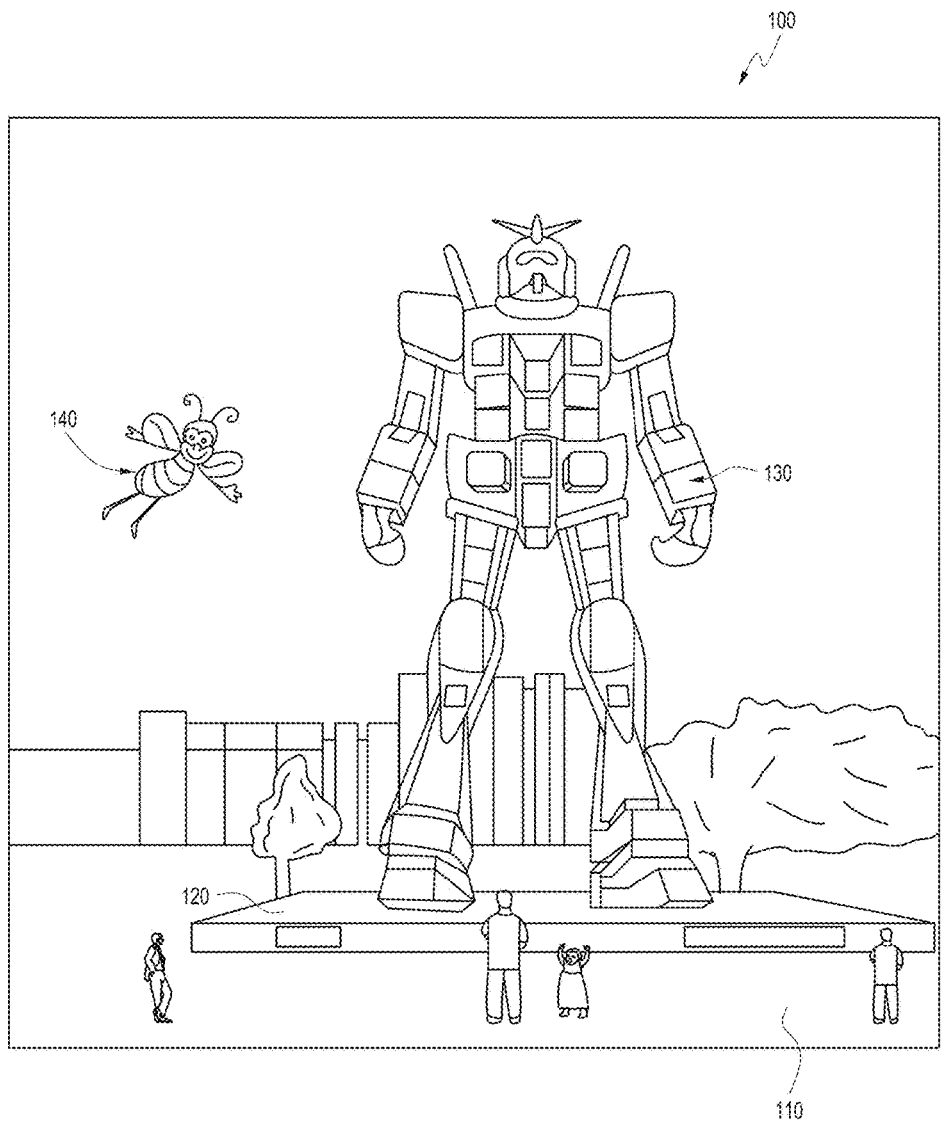
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure. Additionally, the figures in the present disclosure are for illustration purposes and are not to scale. Although the figures show the FOV as a rectangle, this presentation of the FOV is not intended to be limiting. The 2-dimensional representation of the FOV can be any shape, such as, e.g., a circle, oval, triangle, polygon, a rounded square, in combination or the like.

DETAILED DESCRIPTION

Overview

A wearable system can be configured to display augmented or virtual reality content. Accordingly, a user's visual computing experience can be extended to the 3D environment surrounding the user. However, the user field of view (FOV) perceived through the wearable system (also referred to as the user's FOV) may be smaller than the natural FOV of the human eye or smaller than the entire environment surrounding the user. Thus, there may be physical or virtual objects in the user's environment that are initially outside the user's FOV but which may subsequently move into the user's FOV or which may subsequently become perceivable if the user's pose changes (which will change the user's FOV). For example, in the context of a game, the user may be trying to find an avatar of a robot. If the robot is just outside the current FOV of the user, the user will receive no cues from the wearable system that the robot is nearby. If the user moves her head slightly, the robot may suddenly enter the user's FOV, which may be startling to the user. Further, if the user's FOV through the wearable system is relatively small, it may prove difficult for the user to find the robot unless the user turns her head or gazes directly at the robot.

To improve the user's visual experience, the wearable system may inform the user about the objects outside of the user's FOV. For example, the wearable system can render a visual representation of a visual aura for a corresponding object outside of the user's current FOV. The visual representation of the aura can be used to indicate contextual information associated with the object, the user's environment, or user. For example, a brighter or larger aura may indicate the object is closer to the FOV whereas a dimmer or smaller aura may indicate the object is farther from the FOV. Similarly, the color of the aura may be used to indicate the type of the object. For example, an enemy avatar (in a virtual game) may be associated with a red aura while a friendly avatar (in the virtual game) may be associated with a green aura, and a system notification may be associated with a blue aura. A portion of the visual aura can be placed on the edge of the user's FOV. The size, shape, or position of the aura may change as the user's FOV changes or as the object moves. Accordingly, the visual representation of the aura or changes to the visual representation of the aura can thereby provide a useful cue to the user about nearby objects that are currently outside the user's FOV.

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
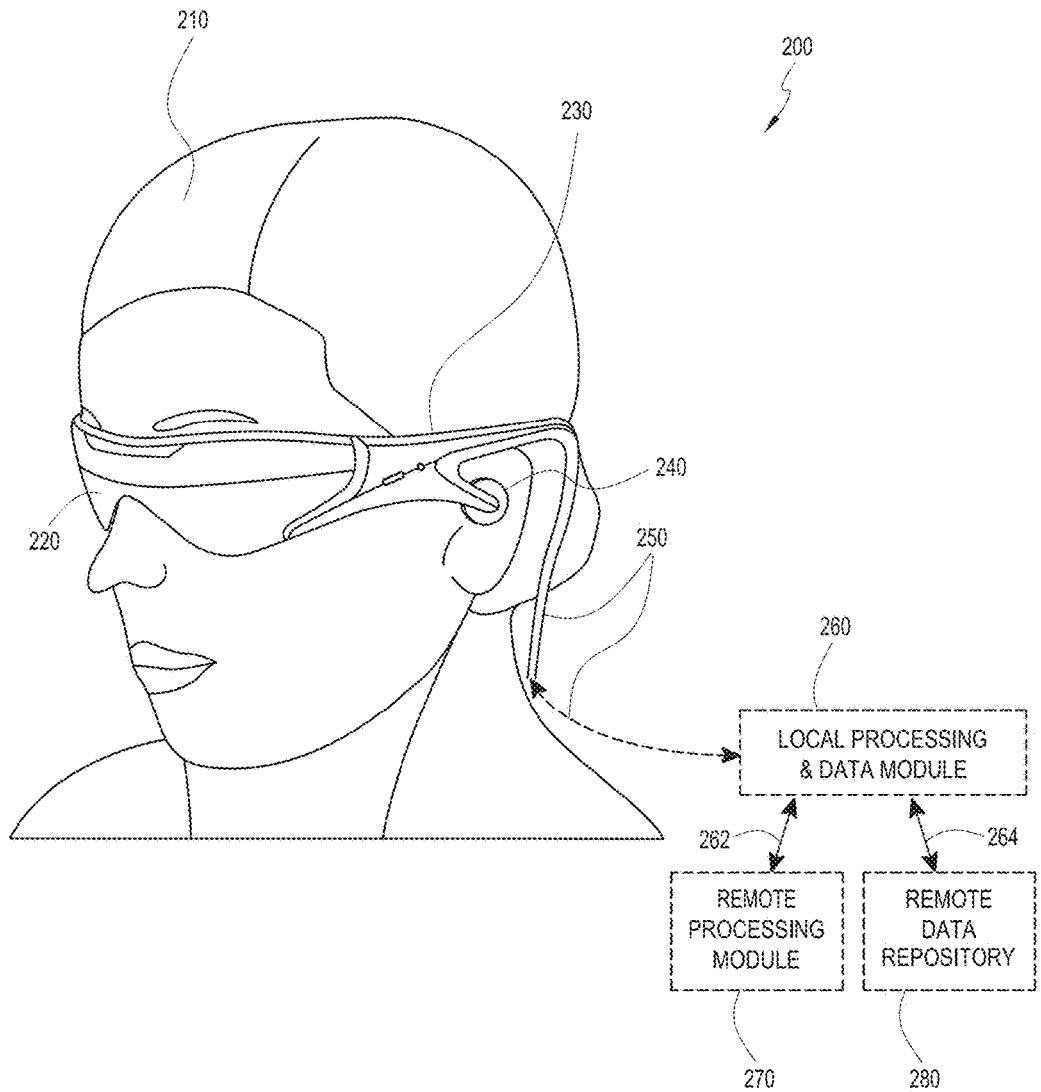
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), microphones, inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data and/or image information. In some embodiments, the remote data repository 280 may comprise a digital data storage facility, which may be available through the interne or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
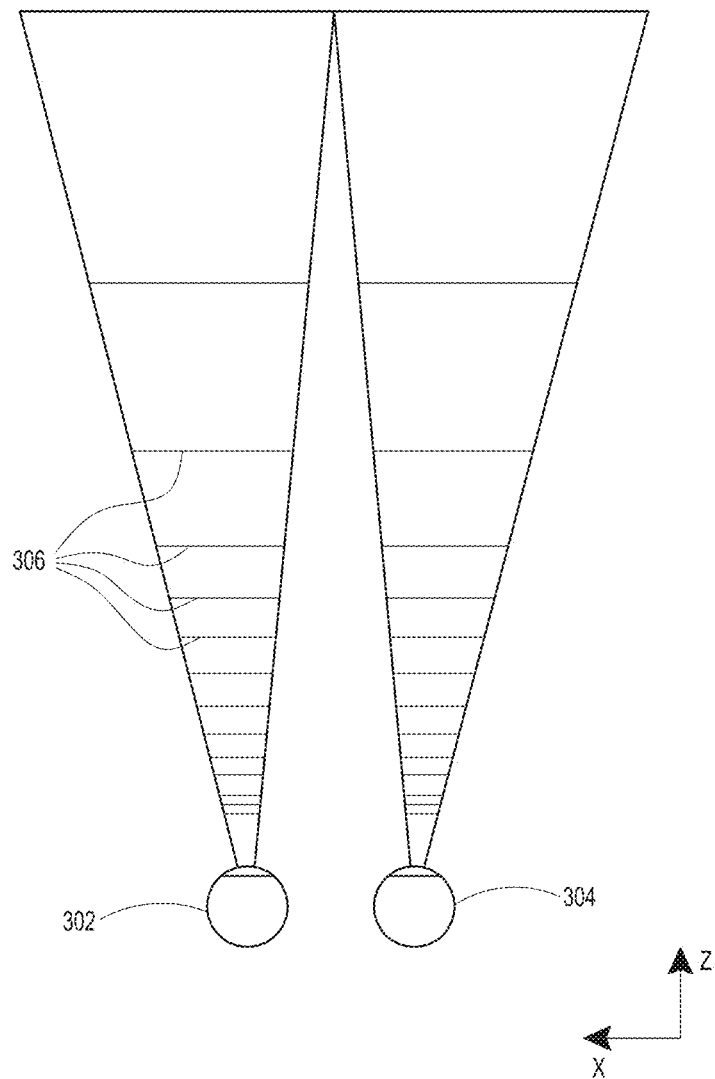
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
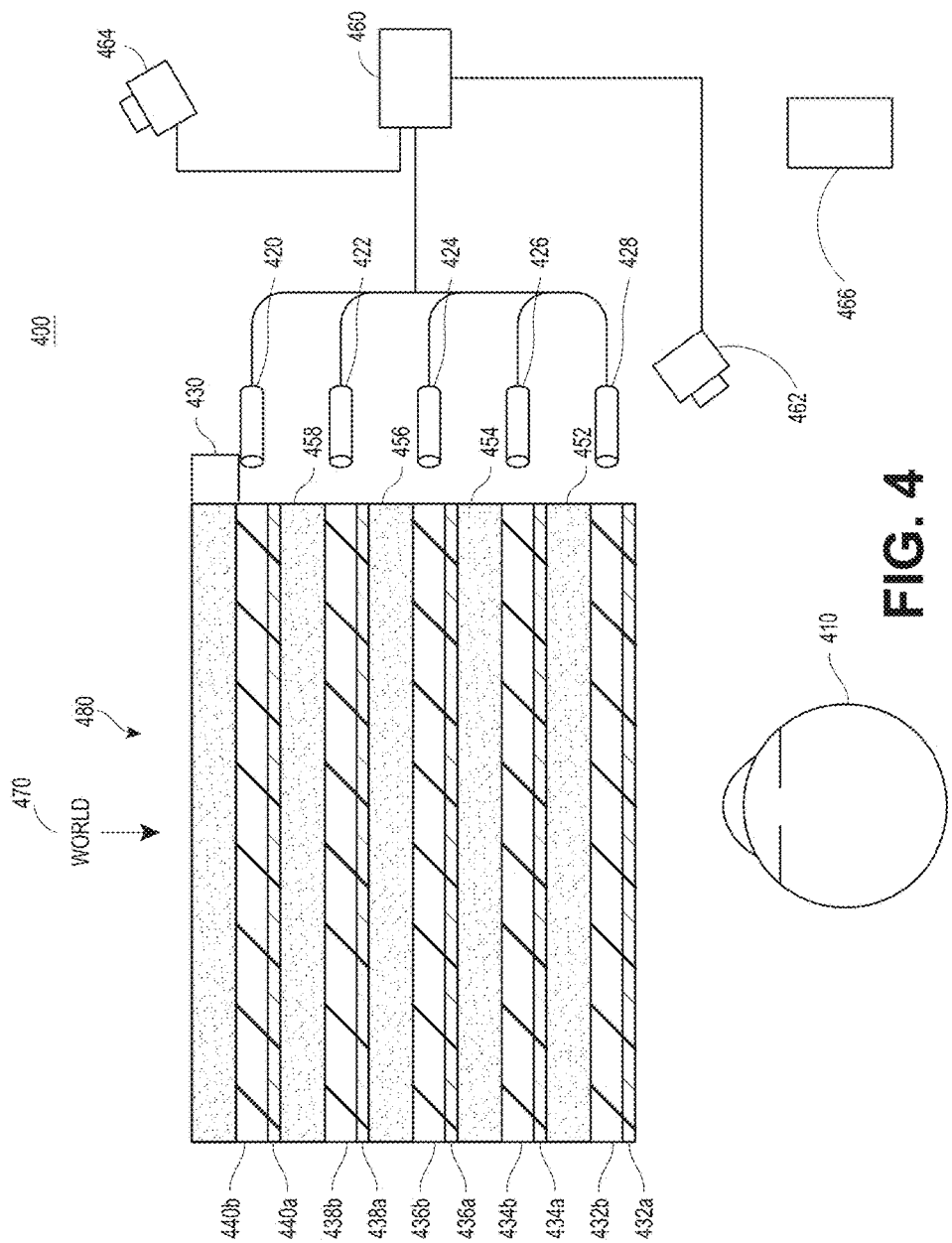
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
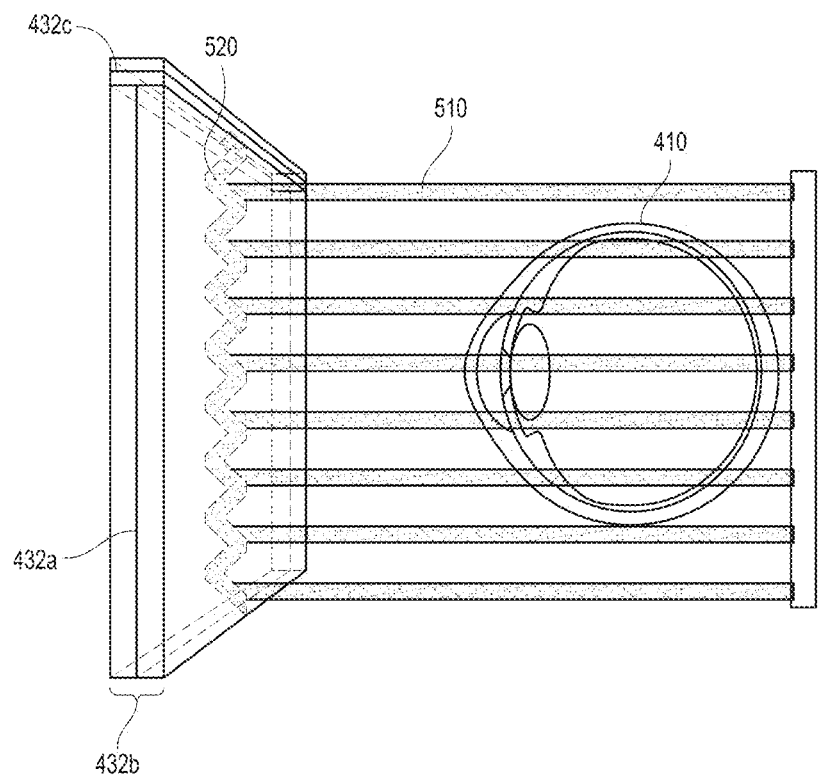
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
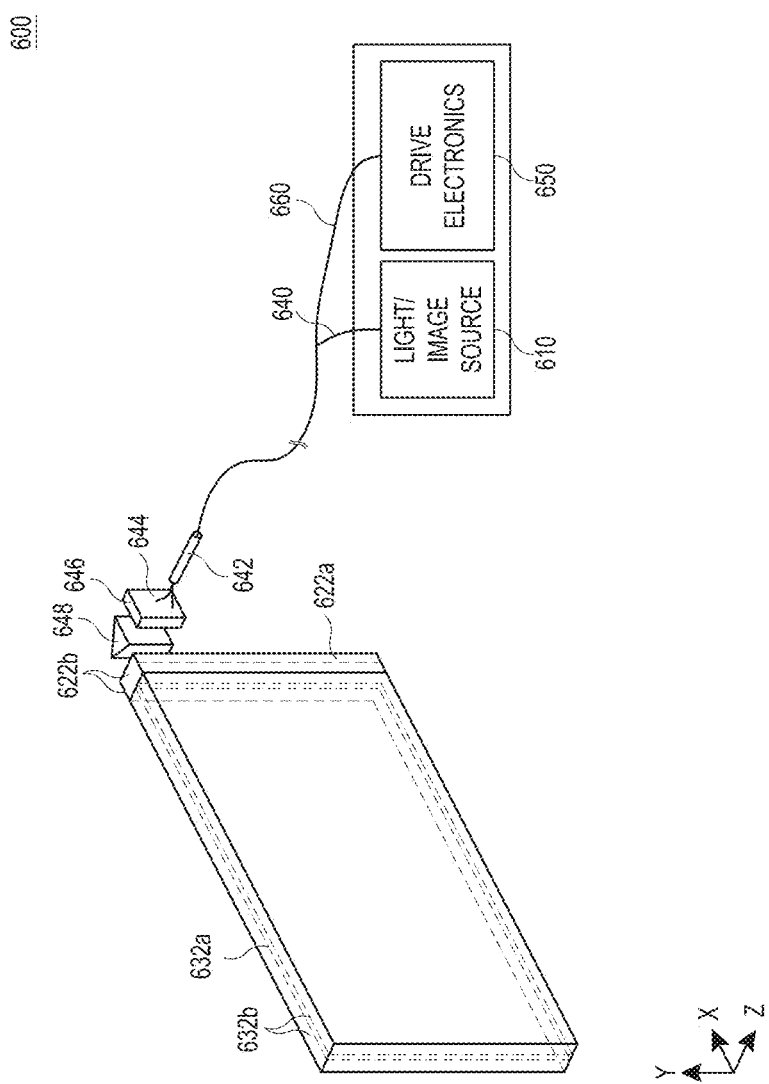
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HIVID, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
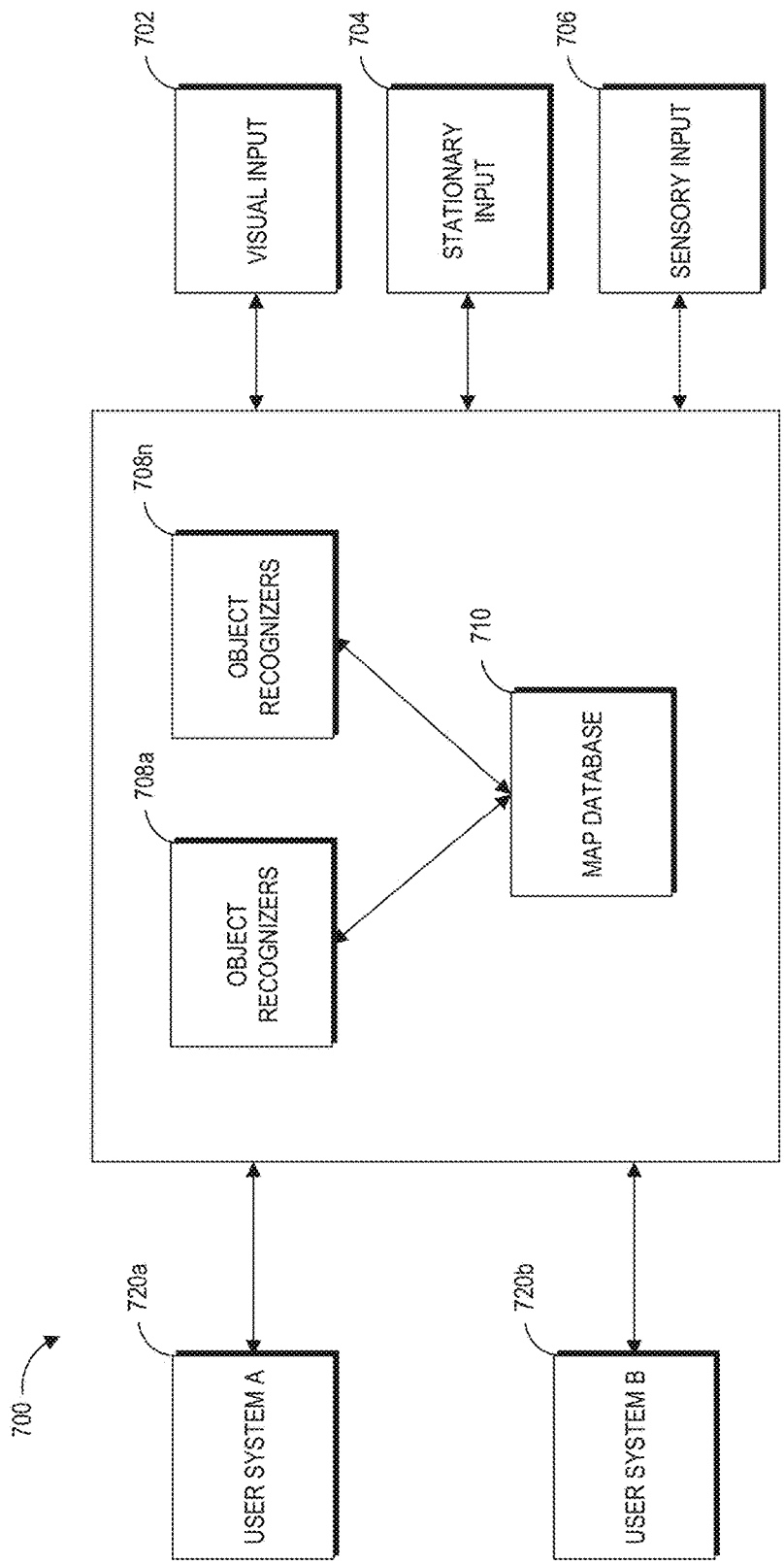
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics. For example, the object recognizer 708a may be used to recognizer faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HIVID can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
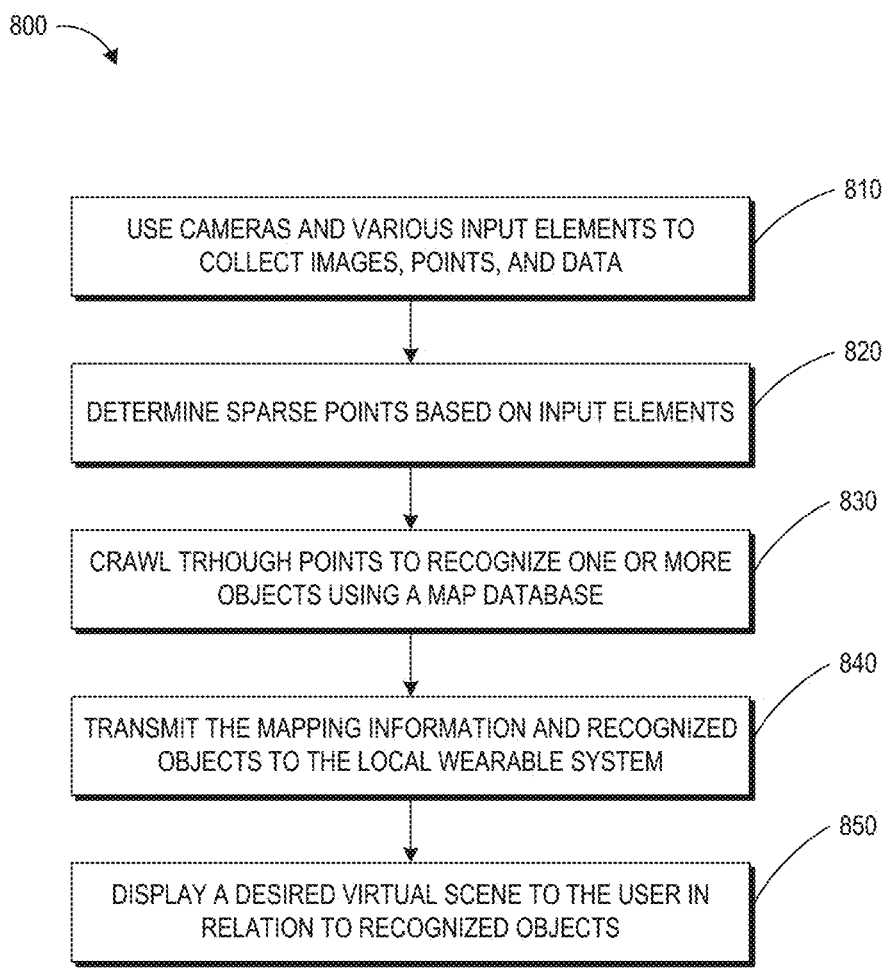
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
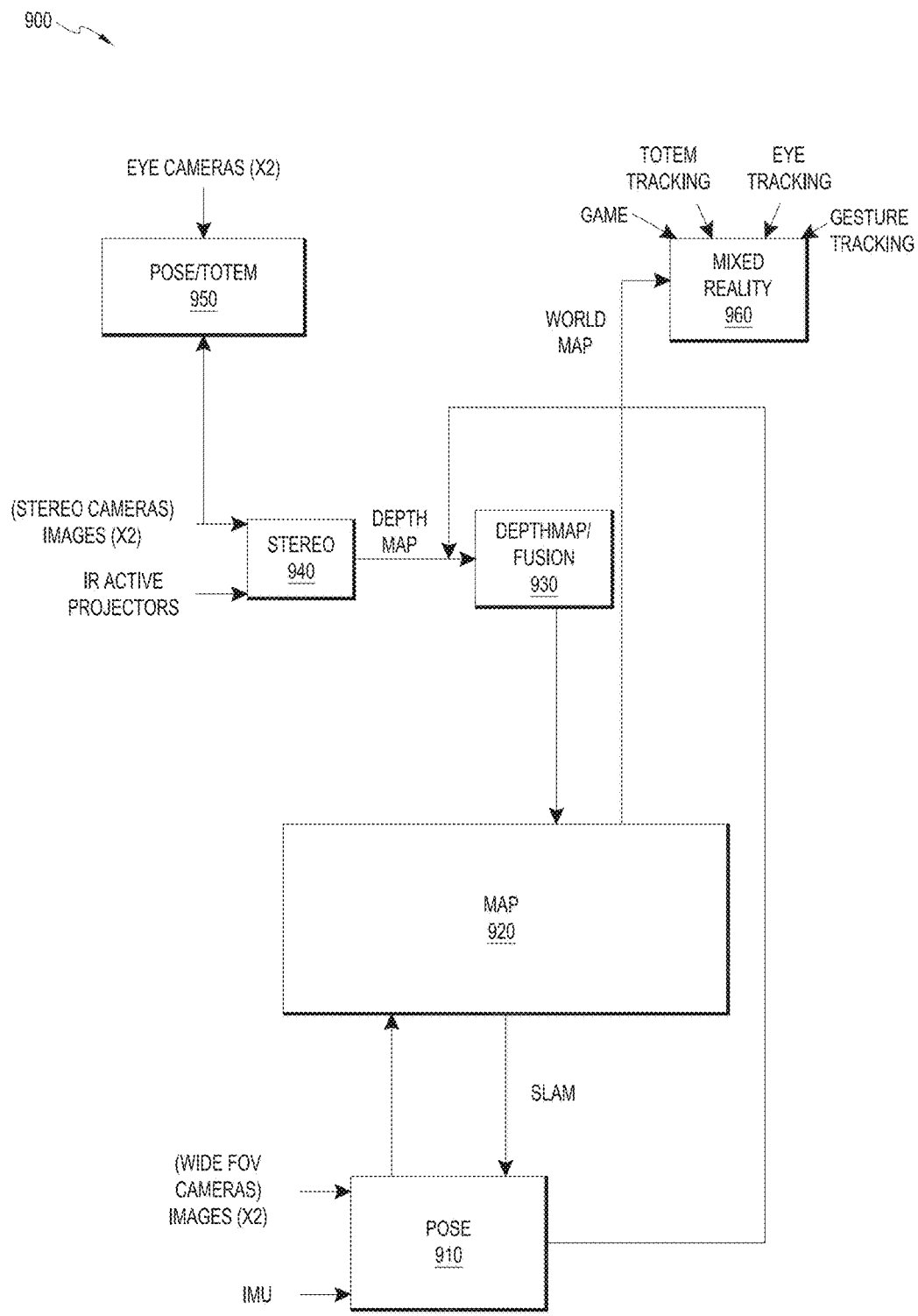
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
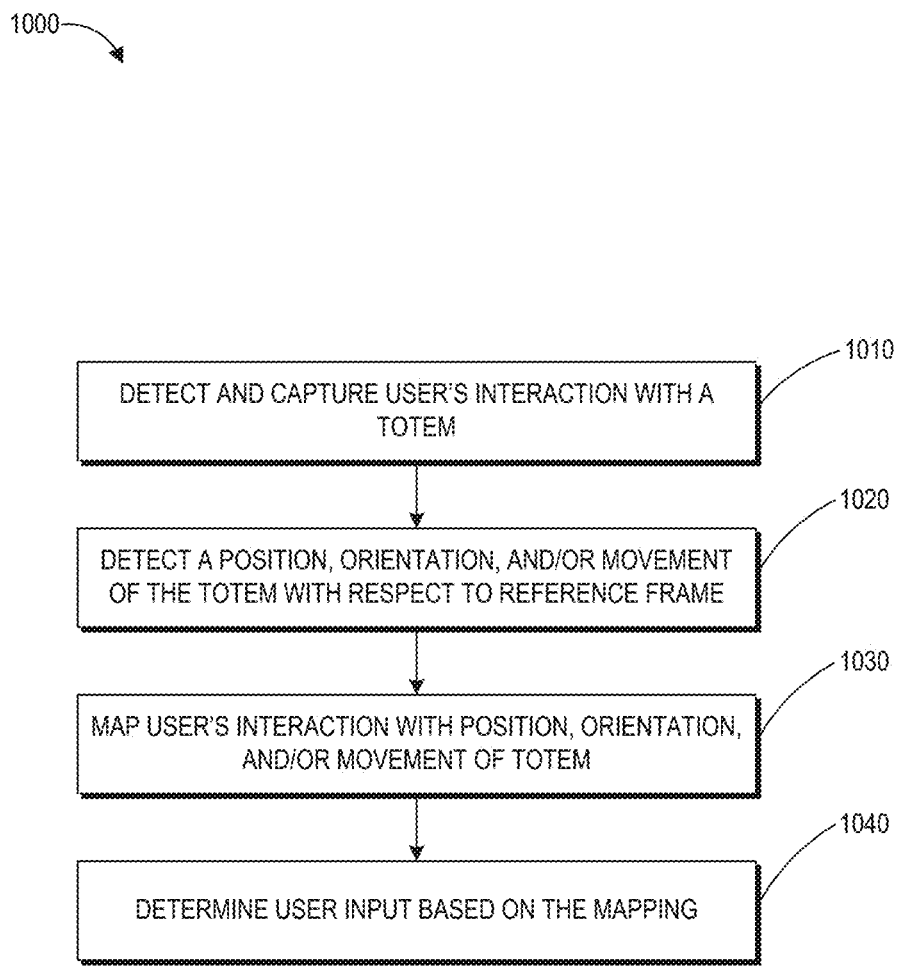
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
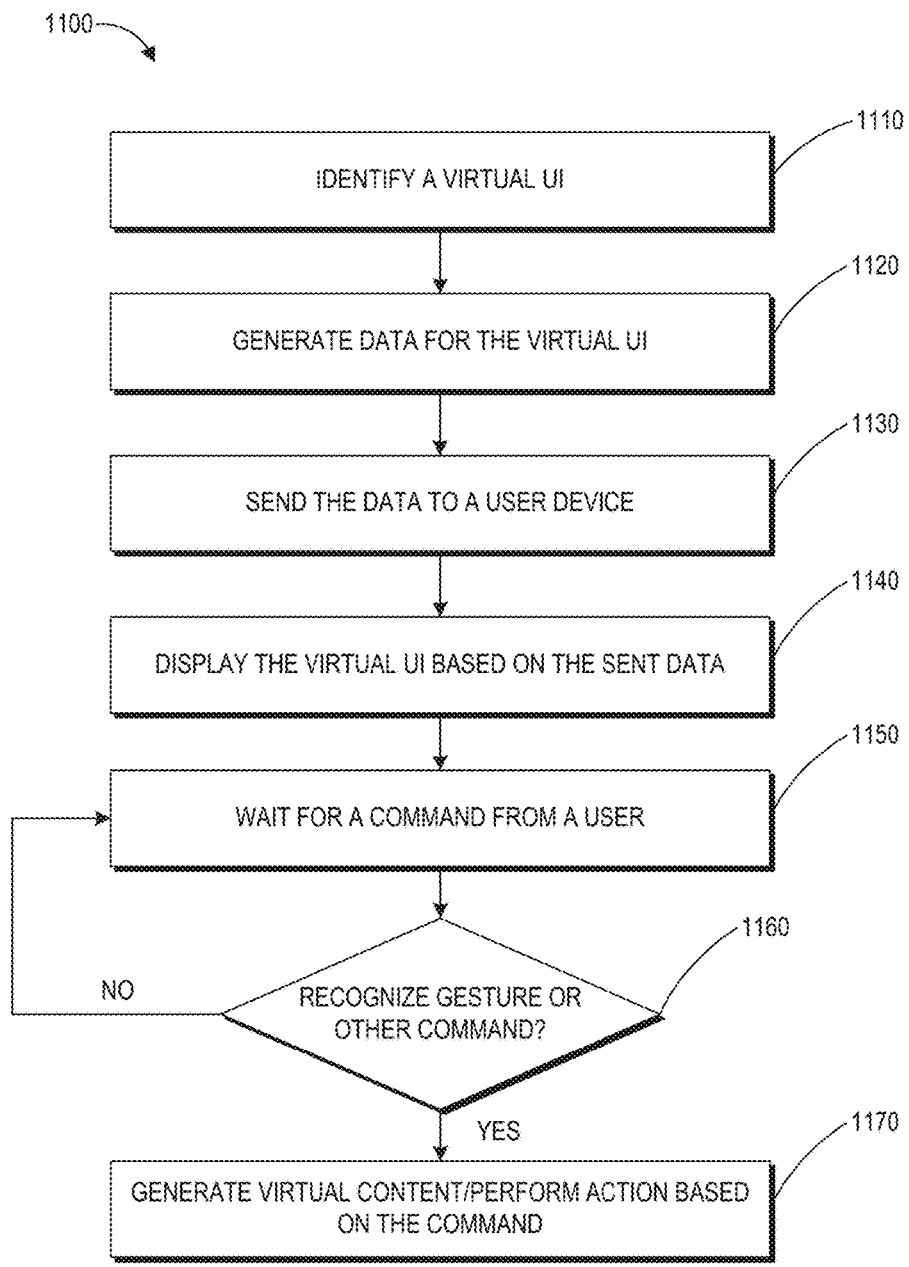
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

Examples Objects in the Field of Regard (FOR) and Field of View (FOV)

Figure 12:
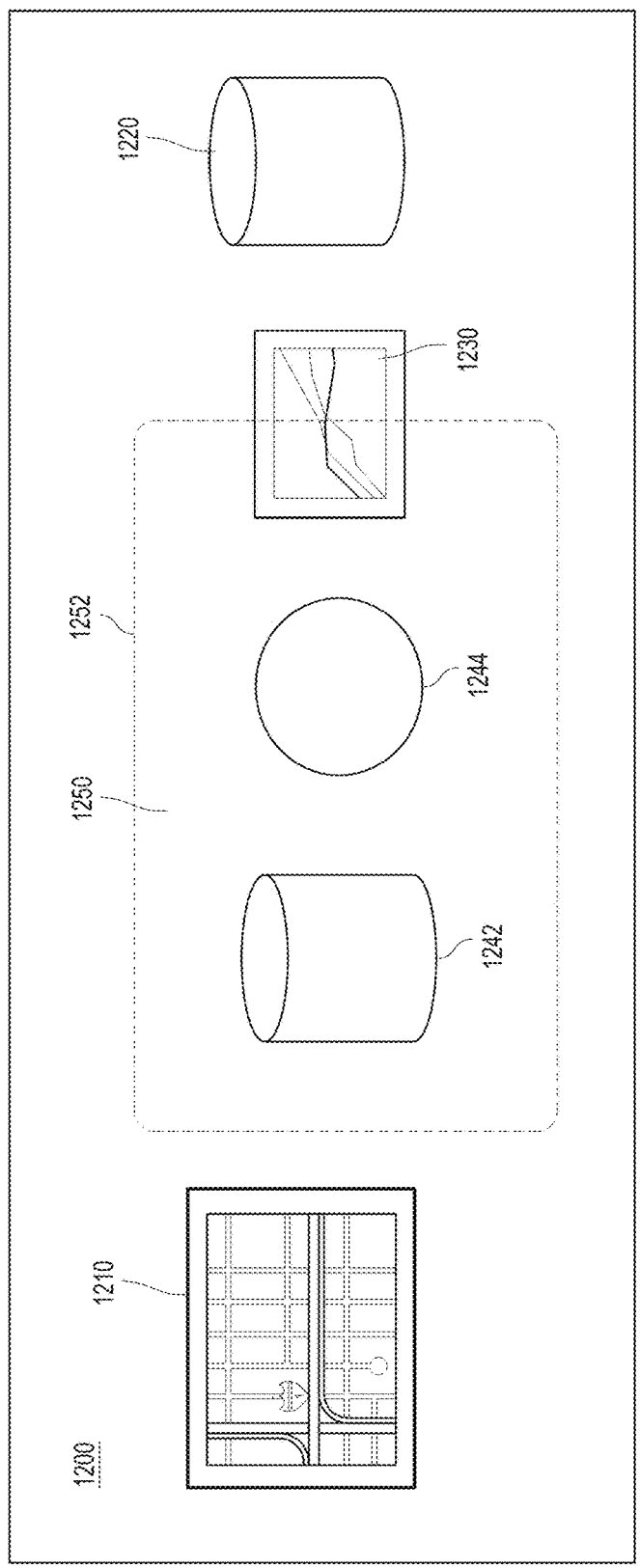
FIG. 12 schematically illustrates an example of virtual objects in a field of view (FOV) and virtual objects in a field of regard (FOR).

FIG. 12 schematically illustrates an example of virtual objects in a field of view (FOV) and virtual objects in a field of regard (FOR). As discussed with reference to FIG. 4, the FOR comprises a portion of the environment around the user that is capable of being perceived by the user via the wearable system. For a head-mounted augmented reality device (ARD), the FOR may include substantially all of the $4\pi$ steradian solid angle surrounding the wearer, because the wearer can move her body, head, or eyes to perceive substantially any direction in space. In other contexts, the user's movements may be more constricted, and accordingly the user's FOR may subtend a smaller solid angle.

In FIG. 12, the FOR 1200 can include a group of objects (e.g. 1210, 1220, 1230, 1242, and 1244) which can be perceived by the user via the wearable system. The objects within the user's FOR 1200 may be virtual or physical objects. For example, the user's FOR 1200 may include physical object such as a chair, a sofa, a wall, etc. The virtual objects may include operating system objects such as e.g., a recycle bin for deleted files, a terminal for inputting commands, a file manager for accessing files or directories, an icon, a menu, an application for audio or video streaming, a notification from an operating system, and so on. The virtual objects may also include objects in an application such as e.g., avatars, virtual objects in games, graphics or images, etc. Some virtual objects can be both an operating system object and an object in an application. In some embodiments, the wearable system can add virtual elements to the existing physical objects. For example, the wearable system may add a virtual menu associated with a television in the room, where the virtual menu may give the user the option to turn on or change the channels of the television using the wearable system.

A virtual object may be a three-dimensional (3D), two-dimensional (2D), or one-dimensional (1D) object. The objects in the user's FOR can be part of a world map as described with reference to FIG. 9. Data associated with objects (e.g. location, semantic information, properties, etc.) can be stored in a variety of data structures such as, e.g., arrays, lists, trees, hashes, graphs, and so on. The index of each stored object, wherein applicable, may be determined, for example, by the location of the object. For example, the data structure may index the objects by a single coordinate such as the object's distance from a fiducial position (e.g., how far to the left or right of the fiducial position, how far from the top or bottom of the fiducial position, or how far depth-wise from the fiducial position). The fiducial position may be determined based on the user's position (such as the position of the user's head). The fiducial position may also be determined based on the position of a virtual or physical object (such as a target interactable object) in the user's environment. This way, the 3D space in the user's environment may be collapsed into a 2D user interface where the virtual objects are arranged in accordance with the object's distance from the fiducial position.

Within the FOR 1200, the portion of the world that a user perceives at a given time is referred to as the FOV 1250 (e.g., the FOV 1250 may encompass the portion of the FOR that the user is currently looking toward). In FIG. 12, the FOV 1250 is schematically illustrated by dashed line 1252. The user of the wearable system can perceive multiple objects in the FOV 1250, such as the object 1242, the object 1244, and a portion of the object 1230. The FOV can depend on the size or optical characteristics of the display of a wearable device. For example, an AR display (e.g., the display 220 in FIG. 2) may include optics (such as, e.g., the stacked waveguide assembly 480 in FIG. 4 or the planar waveguide 600 in FIG. 6) that provides AR/MR/VR functionality when the user looks through a particular portion of the display. The FOV 1250 may correspond to the solid angle that is perceivable by the user when looking through the AR display.

As the user's pose changes (e.g., head pose or eye pose), the FOV 1250 will correspondingly change, and the objects within the FOV 1250 may also change. For example, the map 1210 is initially outside the user's FOV in FIG. 12. If the user looks toward the map 1210, the map 1210 may move into the user's FOV 1250, and for example, the object 1230 may move outside the user's FOV 1250. As will be described herein, the wearable system may keep track of the objects in the FOR 1200 as well as the objects in the FOV 1250.

The user can interact with interactable objects within the user's FOR 1200 and in particular with interactable objects within the user's current FOV 1250 through the wearable system. The interactable objects may be physical objects or virtual objects. For example, the object 1230 may be a virtual graph that shows the change in price of a stock over time. By selecting the virtual object 1230, the user may interact with the virtual object 1230 to, for example, obtain stock quotes, buy or sell the stock, obtain information about the company, etc. To perform these interactions, the wearable system may display menus, toolbars, etc., associated with the virtual object, which can permit the user to perform various actions (e.g., obtaining the stock quote).

The user can interact with objects within the FOV using a variety of techniques, such as e.g., by selecting the objects, moving the objects, opening a menu or toolbar associated with an object, or choosing a new set of selectable objects. The user may interact with the interactable objects using hand gestures to actuate a user input device (see e.g., user input device 466 in FIG. 4), such as, e.g., by clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device. The user may also interact with interactable objects using head, eye, hand, foot, or other body poses, such as, e.g., gazing or pointing with an arm at an object for a period of time, tapping foot, blinking eyes for a certain number of times during a threshold time interval. These hand gestures on the user input device and poses of the user can cause the wearable system to initiate a selection event in which, for example a user interface operation is performed (a menu associated with the target interactable object is displayed, a gaming operation is performed on an avatar in a game, etc.).

In some implementations, the HMD comprises a light field display that is capable of displaying virtual objects at different depth planes relative to the user. The virtual objects can be grouped and displayed at different fixed depth planes. The user's FOV can include multiple depth planes. Accordingly, the virtual objects depicted in FIG. 12 can, but need not be, at different apparent distances from the user.

Examples of Notifying a User of Objects in the FOR

Figure 13:
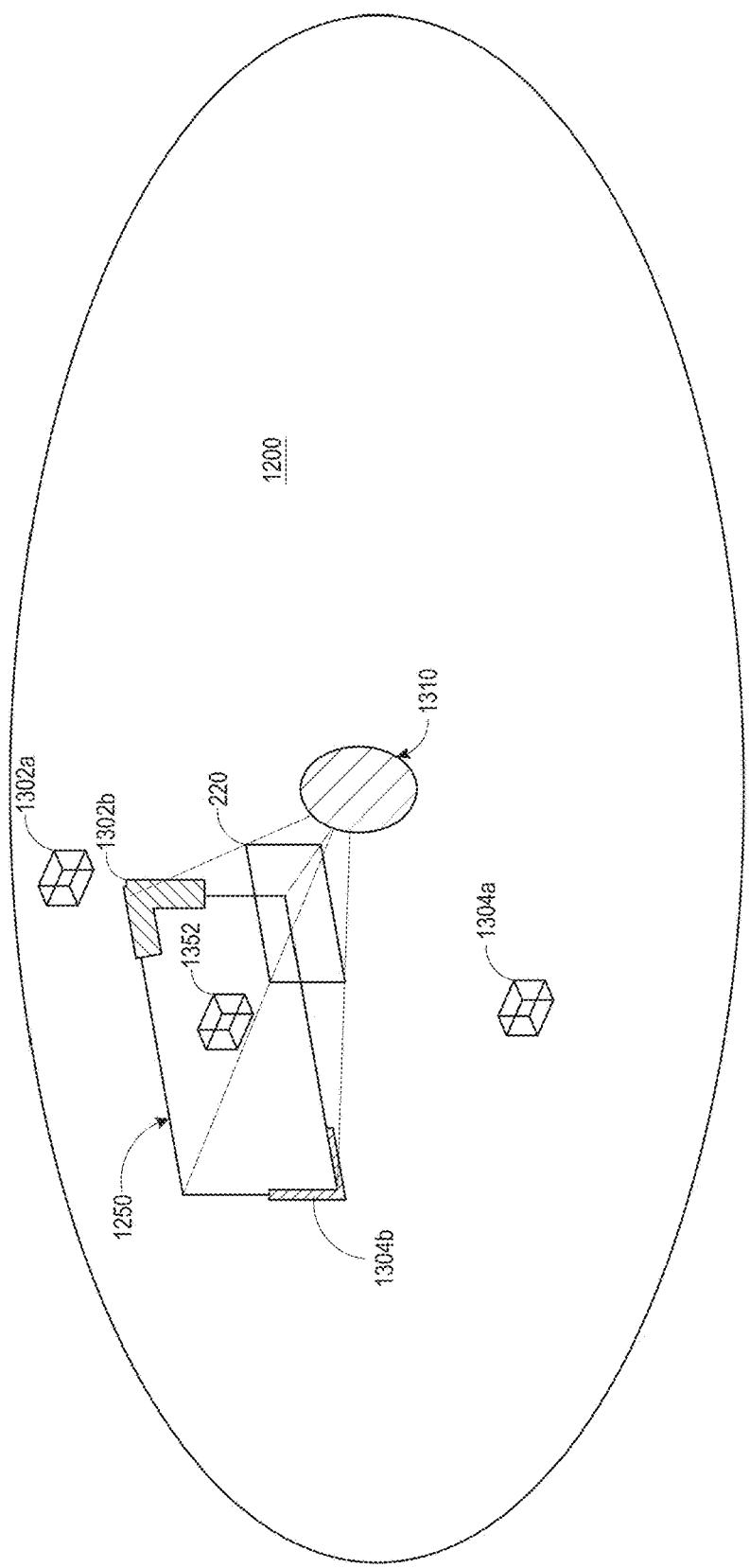

FIG. 13 schematically illustrates an example of informing the user of an object in the user's FOR. The FOR 1200 of a user 1310 has multiple objects such as, e.g. object 1302a, object 1304a, and object 1352. The object 1352 is within the user's FOV 1250 while the objects 1302a and 1304a are outside of the user's FOV but inside of the user's FOR 1200. Any of the objects 1302a, 1304a, 1352 can be virtual objects or physical objects.

In certain implementations, an object in the FOR may be a hidden object such that a user cannot directly perceive the object via the display 220. The display 220, however, can present the hidden object when the user actuates a user input device or when the user uses certain poses (such as, e.g. head, body, or eye pose). For example, as illustrated in FIG. 13, the object 1352 may initially be hidden from the user's view. But the display can show the object 1352 if the user clicks on the user input device 466.

The wearable system can provide an indication of an object outside of a user's FOV by placing a visual aura near the edge of the user's FOV. In FIG. 13, the wearable system can place one aura 1304b for the object 1304a and another aura 1302b for the object 1302a on the edge of the user's FOV 1250.

The wearable system can calculate a visual representation of the visual aura based on contextual information associated with the corresponding object, the environment, or the user (such as, e.g., the pose of the user, or the user's preference). The visual representation of the visual aura can include shape, color, brightness, position, orientation, size, or other visual effects or characteristics of the visual aura.

To determine the visual representation of the visual aura based on the contextual information of a corresponding object, the wearable system can use a variety of characteristics associated with the corresponding objects, such as, e.g., location of the object (including the proximity of the object relative to the user), urgency of the object, type of the object (such as, e.g., interactive v. not interactable, physical v. virtual, an operating system object v. a game object), property of the object (such as e.g. enemy's avatar v. friend's avatar), volume of information (such as, e.g., number of notifications), etc. As an example of calculating the visual representation of the visual aura based on the location of the corresponding object, the aura 1304b may appear thinner than the aura 1302b because the object 1304a is further away from the user's FOV than the object 1302a. As another example, the aura 1302b may have a larger and brighter appearance because the object 1302a is more urgent and/or closer to the user's FOV. The visual representation of the visual aura may change over time based on a change of the object associated with the visual aura. For example, the aura 1304b may get bigger (or brighter) as the object 1304a moves closer to the user's FOV or may grow smaller (or dimmer) as the object 1304a moves away from the user's FOV.

In certain implementations, the visual representation of the aura can be determined based on the existing volume of information of the corresponding object. For example, the object 1302a may be a messaging application which can be configured to receive and send messages for the user 1310. As the object 1302 receives more messages, the aura 1302b can grow thicker to indicate the accumulation of messages.

The wearable system may assign a color to an aura based on the characteristics of the associated object. For example, the wearable system may assign a red color to the aura 1304b because the object 1304a is associated with the red color. Similarly, the AR system may assign a blue color to the object 1302b because it is an operating system object and the AR system assigns the blue color to all operating system objects. The assigned color is not limited to being a single color but may include multiple colors, shadings, contrasts, saturations, etc. The visual representation of the aura may also include visual effects such as, e.g., animations (e.g., translating or rotating the aura), fading in or out, etc. The visual representation of the aura may be accompanied by a sound, a tactile sensation, etc.

The wearable system can also determine the visual representation of the visual aura based on a user's pose. For example, as the user 1310 turns leftwards, the object 1304*a* may become closer to the user's FOV while the object 1302*a* may be farther away from the user's FOV. As a result, the aura 1304*b* may become brighter (or larger) while the aura 1302*b* may become dimmer (or smaller). The position of aura may change as the objects and/or user moves. For example, the AR system may show the aura 1304*b* on the right side of the FOV 1250 when the object 1304*a* moves to the right side of the user 1310.

In addition to or in alternative to determining the visual representation of the visual aura based on characteristics of the objects or the user's pose, the wearable system can use contextual information associated with the user's environment to determine the visual representation of the visual aura. The contextual information associated with the user's environment can include the light condition of the environment. The light conditions may be based on the environment as perceived by the user through the display 220. The environment as perceived by the user could be the user's physical surroundings such as the user's room or virtual environments (such as, e.g., a simulated jungle in a game). With reference to FIG. 13, the aura 1304*b* may initially be invisible to the user 1310. This may be because the user perceives a dark environment through the display 220. Since dark objects are typically not perceptible, the wearable system may not display an aura for objects in the dark environment. However, the wearable system can show the aura 1304*b* on the edge of the user's FOV when a light illuminates the object 1304*a*. The light can come from one or more off screen objects, light sources (real or virtual), etc.

In certain embodiments, the visual representation of the aura can correspond to optical effects of objects under the light condition of the environment. For example, the shape of the aura (e.g. an oval) may be the two-dimensional projection of the object (e.g. a football) associated with the aura. In this example, the visual aura can appear as if the football is projected onto the edge of the user's FOV.

When an aura corresponds to a virtual object, the wearable system can simulate optical effects of the virtual object as if it is a physical object. For example, in FIG. 13, the object 1304*a* may be a virtual object which can reflect red color if it is a physical object. Accordingly, the display 220 of the wearable system 220 may display the aura 1304*b* as having a red color (illustrated in a cross-hatched pattern) when a light is shined on the object 1304*a*.

The optical effects can also incorporate location information of the object. For example, when an object is behind the user, the shape of the reflected object is naturally longer and thinner. The user can use this shape to differentiate this object from another object which is to the immediate right or left of the user's FOV. For example, in FIG. 13, the object 1304*a* is farther away and behind the user (e.g., as compared to the object 1302*a*). Accordingly, the aura 1304*b* may have a thin shape with low brightness. The aura 1302*b*, however, is thicker and shorter because the object 1302*a* is immediately to the right of the user's FOV.

The wearable system can render a visual representation of the aura with the display 220. The wearable system can render at least a portion of the visual representation of the aura near the FOV 1250 of the user. In some embodiments, when an object is within the FOV 1250, the wearable system can be configured not to determine the corresponding aura. In other embodiments, the wearable system can still determine the visual representation of the aura even though the object is within the FOV 1250. Rather, the wearable system can be configured not to render the visual representation of an aura for an object within the FOV because the object is perceivable by the user. As shown in FIG. 13, the object 1352 is within the user's FOV 1250 but the wearable system can be configured not to project an aura onto the edge of the FOV for the object 1352.

In certain implementations, although the object within the FOV may still have its corresponding aura, the wearable system can be configured to hide the visual representation of aura (e.g., such that the user will not perceive the aura) through optical effects associated with the display 220. For example, where the visual representation of the aura is determined in accordance with the light conditions, the interior surface edge of an aura (corresponding to an object inside of the FOV) can be configured to co-linearly align with wearable system's the imaging system (such as, e.g., a simulated light source and/or cameras shown in FIG. 2) or the user's eye(s). In such examples, the user will not perceive reflections from the interior surface edge caused by light sources within the FOV, and therefore will not perceive the aura corresponding to the object inside of the FOV.

Besides visual auras, the wearable system can also inform the user about objects outside of the user's FOV using a tactile or an audio effect. For example, in an augmented reality game, the wearable system may notify the user of an approaching enemy through vibrations on a user input device. The wearable system may provide strong vibrations when the enemy is close to the user while provide weak vibrations when the enemy is relatively far away from the user. In another example, the wearable system can use audible sounds to provide position information of a virtual object. The wearable system may use a loud sound to alarm the user of a virtual enemy which is nearby. The wearable system can also simulate a sound field which reflects the spatial locations of the virtual object. The tactile, audio, or visual aura can be used in combination or in alternative to inform the user about the surrounding objects.

Example Visual Presentations of an Aura

Figure 14A:
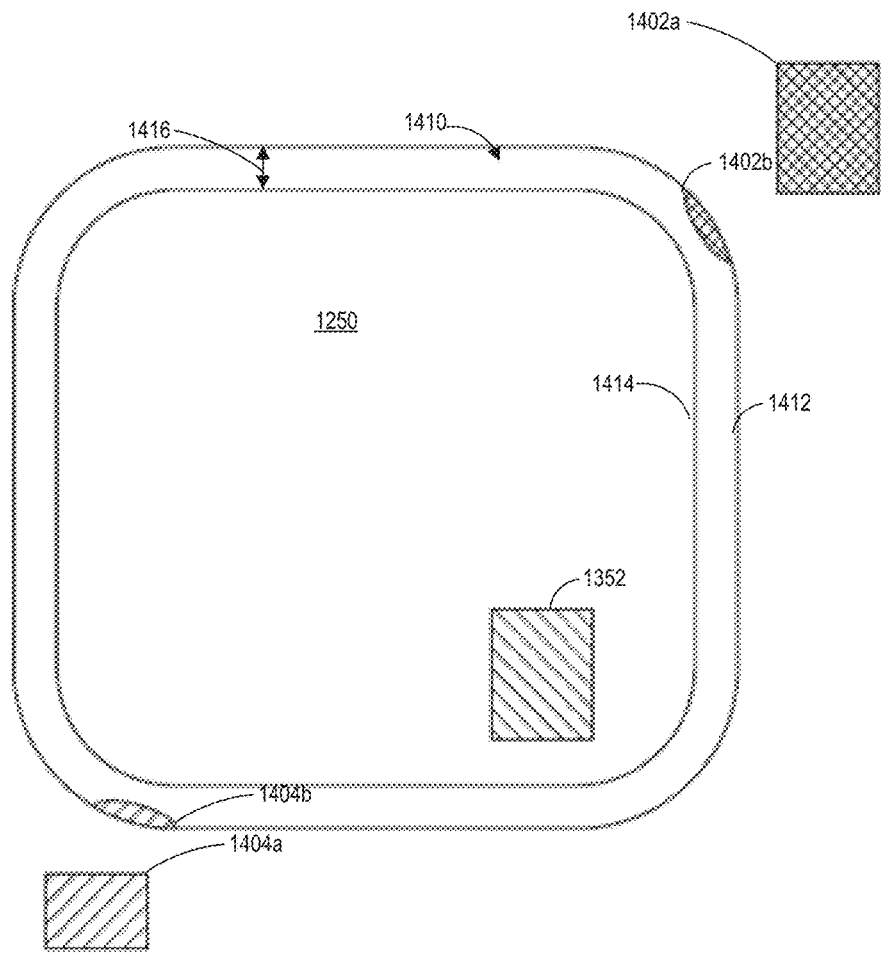
FIG. 14A schematically illustrates a perspective view of visual auras on an edge of an FOV.

FIG. 14A schematically illustrates a perspective view of visual auras on an edge of an FOV. In this example, the edge 1410 is the area that is at the outer boundary of the FOV 1250. The edge 1410 of the FOV 1250 can comprise an outer rim 1412 and an inner rim 1414. The edge may have a width 1416. The wearable system can place a portion of the aura on edge 1410 of the FOV 1250. For example, a portion of the aura 1402*b* is on the edge 1410 of the FOV 1250. As another example, the wearable system can place the entire aura 1404*b* in between the outer rim 1412 and the inner rim 1414. The auras may have a variety of sizes. Some auras may have a diameter smaller than or equal to the width 1416 of the edge 1410 of the FOV 1250, while other auras may have a diameter greater than the width 1416 of the edge 1410 of the FOV 1250.

The wearable system can determine and render visual representations of an aura separately for each eye to match human peripheral vision. For example, the wearable system may render a visual representation of the aura 1402*b* for only the right eye instead of both eyes because the location of the object 1402*a* is not within the FOV of the left eye. This technique can also be used to simulate human eye experience of observing an object's movements. For example, the wearable system can determine the visual representation of the aura to simulate the effect of the object fading out the left edge of the right eye and the right edge of the left eye.

By presenting auras separately for each eye, the wearable system can reduce the likelihood that the human eyes resolve the aura at depth because the aura for each eye does not match stereoscopically. Advantageously, in some embodiments, this reduces visual competition between the auras and other virtual content perceived through the wearable system.

Figure 14B:
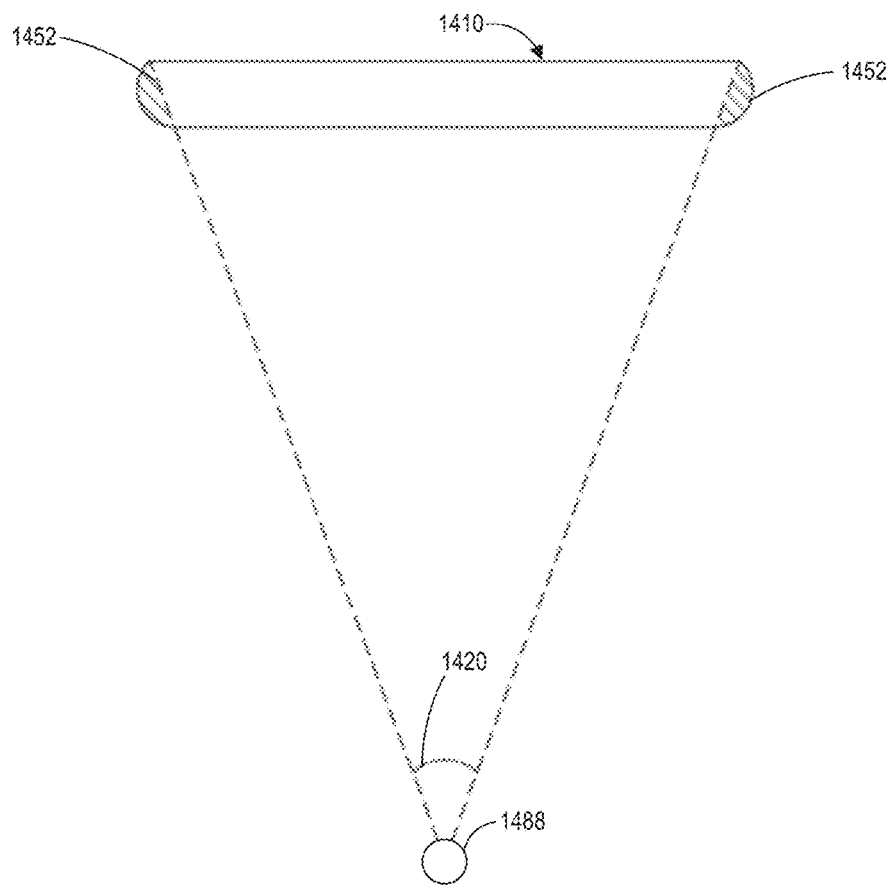
FIG. 14B schematically illustrates an example of making a corresponding aura invisible for an object within the user's FOV.

FIG. 14B schematically illustrates an example of making a corresponding aura invisible for an object within the user's FOV. As shown in FIG. 14B, there can be a distance between the human eye 1488 and the edge 1410 of the FOV as perceived by the user through the wearable system. There can be a FOV angle 1420 when a user uses the HMD. The degree of the FOV angle 1420 may be determined based on the distance between the human eye and the edge 1410. The degree of the FOV angle 1420 may also be based on the physical and chemical characteristics of the display 220. As the degree of FOV angle 1420 changes, the visual representation of the aura may also change.

As described with reference to FIG. 13, the wearable system may determine the visual representation of the aura by simulating light conditions in the user's environment. Such light conditions can be applied to both objects within the FOV and objects outside of the FOV. The wearable system can place the aura for an object within the user's FOV in a way such that the user will not be able to see the aura associated with the object within the user's FOV. For example, in FIG. 14B, the aura 1452 can be associated with the object 1352 (shown in FIG. 14A). The wearable system can be configured to position the interior surface edge of the aura 1452 to be co-linearly aligned with the imaging system of the wearable system or the eye of the user. In this configuration, the user may not see the inside edge of the aura 1452.

Example User Experience with a Visual Aura

Figure 15A:
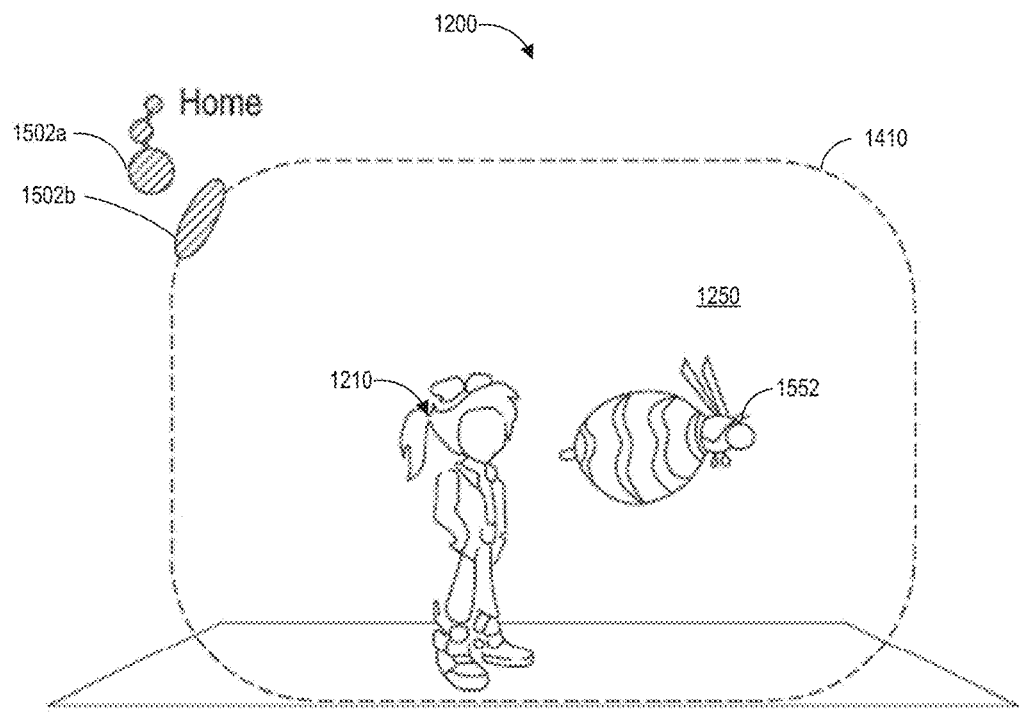
FIGS. 15A and 15B schematically illustrate examples of user experiences with a visual aura.
Figure 15B:
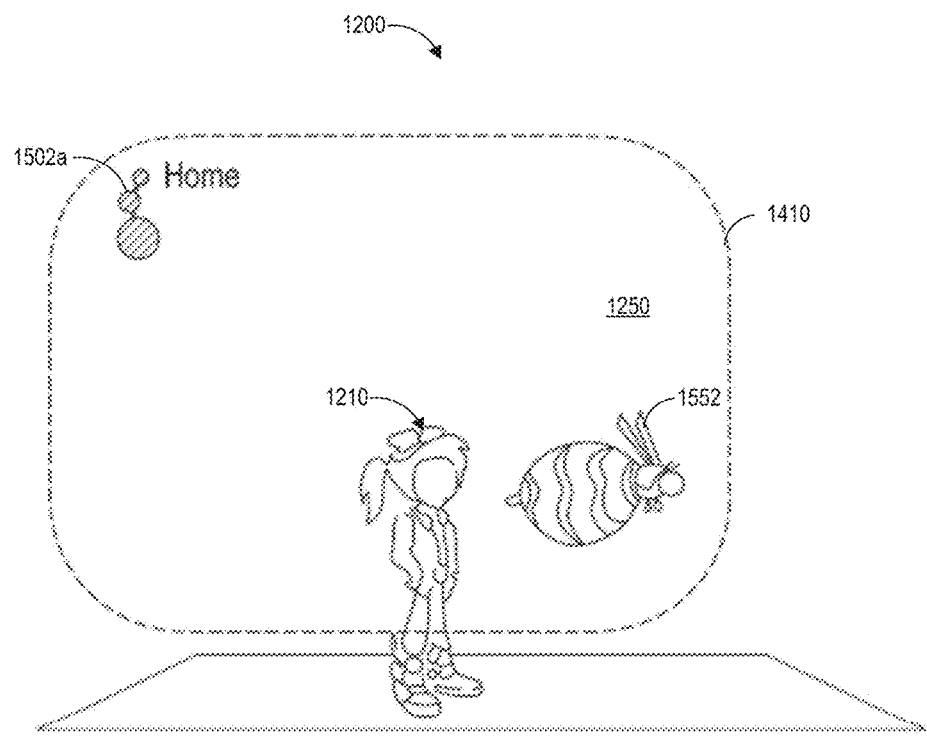

FIGS. 15A and 15B schematically illustrate examples of user experience with a visual aura. In FIG. 15A, the user 1210 can stand in a room. The user 1210 can a FOR 1250 and a FOV 1250 when the user 1210 wears an HMD. The object 1552 is within the user's FOV. The object 1552 may be an object in an application. For example, in FIG. 15A, the object 1552 may be a virtual creature that the user 1210 perceives through the display 220.

As shown in FIG. 15A, the object 1502a is within the user's FOR 1200 but is outside of the user's FOV 1250. The object 1502a may be an object associated with an operating system. For example, as indicated in FIG. 15A, the object 1502a can be a home object which can direct the user to the main page of the user's HMD. The wearable system can show a portion of the visual aura 1502b of the object 1502a on the edge 1410 of the FOV 1250. The wearable system can determine a visual representation of the aura using various contextual factors described with reference to FIGS. 13, 14A, and 14B and render the visual representation of the visual aura 1502b accordingly.

When a user changes his pose (such as by tilting his head), the object 1502a can move inside the user's FOV 1250 as shown in FIG. 15B. In some embodiments, the display 220 of the wearable system will not show the aura for the object 1502a when it is inside of the FOV 1250. In other embodiments, the wearable system may be configured to make the interior surface edge of the aura 1502a to be co-linearly aligned with the wearable system's the imaging system (such as, e.g., simulated light source and/or cameras shown in FIG. 2) or with the user's eye(s). Accordingly, the user may not be able to perceive the aura if the object 1502a is within the FOV 1250.

Example Processes of Determining a Visual Representation of an Aura

Figure 16:
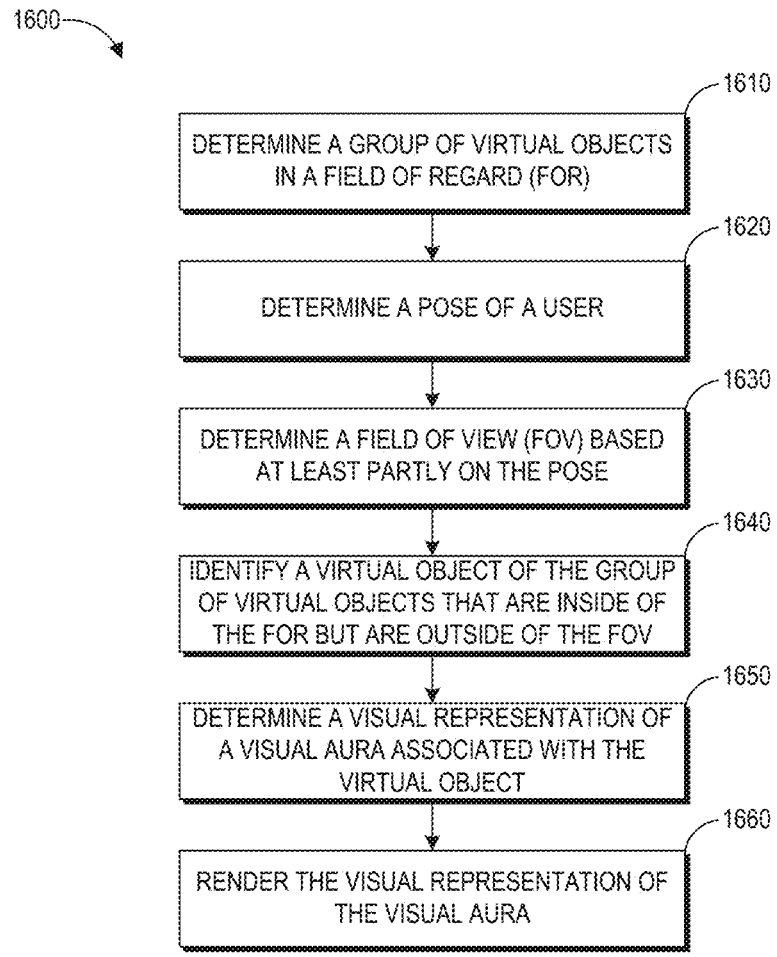
FIG. 16 illustrates an example process of rendering a visual representation of a visual aura.

FIG. 16 illustrates an example process of rendering a visual representation of a visual aura. The process 1600 can be performed by the wearable system described herein (see e.g. wearable system described with reference to FIGS. 2 and 4).

At block 1610, the wearable system determines a group of virtual objects in the user's FOR. The group of virtual objects can be a subset of objects in the user's environment. In certain embodiments, the virtual objects may be hidden from a user's view.

At block 1620, the wearable system can determine the user's pose. The user's pose may be the head, eye, body pose, alone or in combination. The wearable system can determine the user's pose based on data acquired from a variety of sensors, such as e.g., an inward-facing imaging system (see, e.g. the inward-facing imaging system 462 in FIG. 4), inputs received on a user input device (see e.g. user input device 466 in FIG. 4), FOV camera and/or sensors (see descriptions with reference to FIG. 10).

At block 1630, the wearable system can determine the user's FOV based on the user's pose. The FOV can comprise a portion of the FOR that is perceived at a given time by the user.

Based on the user's FOV, at block 1640, the wearable system can identify a virtual object which is inside of the FOR but outside of the FOV of the user. In some implementations, the wearable system may be configured to display auras for some objects in the user's FOR. The wearable system can identify the virtual object for which a visual aura is rendered based on the contextual information described herein. For example, the wearable system can be configured to render the visual aura based on the type of virtual object, where the wearable system can render the visual aura if the virtual object is interactable. As another example, the wearable system will render the visual aura if the virtual object is within a threshold distance from the user. As yet another example, the wearable system can be configured to sort the virtual objects (that are outside of the FOV) based on the contextual information and the wearable system may only render an aura associated with the most urgent object. In certain implementations, the wearable system can display auras for all virtual objects in the FOR.

In the situation where a virtual object is a hidden object, the visual aura can provide a cue on the direction and position of the hidden treasure. For example, in a treasure hunt game, the visual aura can provide an indication of the location of the hidden treasure. In some embodiments, one visual aura can correspond to more than one object. For example, the wearable system can render a visual aura indicating a set of office tools is available right next to the user's current position.

At block 1650, the wearable system can determine a visual representation of a visual aura associated with the virtual object. The wearable system can use a variety of contextual factors to determine the visual representation of the aura. For example, the wearable system may calculate the location of the virtual object relative to the FOV of the user. In certain embodiments, the wearable system can determine the visual representation using the local processing and data module 260 alone or in combination with the remote processing module 270 (shown in FIG. 2). For example, the remote processing module 260 can determine a color of the visual aura, while the local processing and data module 260 can determine the location and size of the visual aura. As another example, the remote processing module 270 can determine a default visual representation while the local processing and data module 260 can track the movements of the user (or the virtual object corresponding to the aura) and adjust the default visual representation accordingly. For example, local processing and data module 260 can access the default visual representation of the aura from the remote data repository and adjust the size and brightness of the default visual representation of the aura based on the virtual object's position relative to the user's FOV.

At block 1660, the wearable system can render the visual representation of the visual aura. The visual representation can be rendered based on the determination in the block 1650. A portion of the visual aura may be placed on the edge of the user's FOV. In some situations where there are multiple visual auras to be displayed, the wearable system may place a portion of a visual aura to overlap with a portion of another visual aura. As described herein, the wearable system may render representations of the aura separately for each eye. The separate presentations may be able to match human peripheral vision and to simulate human eye experience of observing an object's movements. In certain implementations, the visual aura of a virtual object will be rendered on the edge of the FOV for one eye but not for the other eye.

Although the example process 1600 is described with reference to rendering visual representations of the aura associated with a virtual object, in certain embodiments, the aura may also be associated with a physical object (such as, e.g., a television, a coffee-maker, etc.).

Figure 17:
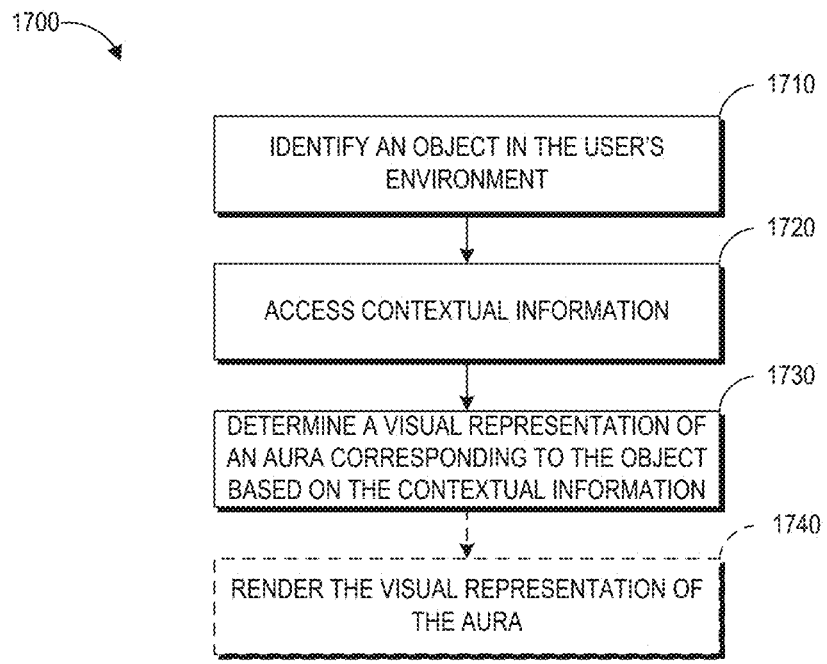
FIG. 17 illustrates an example process of determining a visual representation of the visual aura based on contextual information.

FIG. 17 illustrates an example process of determining a visual representation of the visual aura based on contextual information. The process 1700 can be performed by the wearable system described herein (see e.g. wearable system described with reference to FIGS. 2 and 4).

At block 1710, the wearable system can identify an object in the user's environment. The object may be a physical object or a virtual object, and the environment may be the user's physical or virtual environment. The wearable system can identify the objects using the techniques described with reference to the process 1600 in FIG. 16. In certain embodiments, the object identified in the user's environment may be a hidden object. The hidden object may be occluded (e.g. blocked by another object) from a user's view or may become perceivable upon a user interface operation, such as, e.g., an actuation of the user input device 466 or a change in the user's pose.

As described with reference to FIG. 16, the wearable system can identify the object based on the user's FOV. The FOV of the user may be determined based on the optical characteristics of the display of the wearable system and the user's pose (such as a body pose or a head pose) as described herein. In some embodiments, the identified object is outside of the user's FOV but is inside of the FOR. The wearable system can determine whether an object is outside of the user's FOV using a world map 920 (described in FIG. 9) of the user's environment. For example, the wearable system can determine the user's current location and position the user in the world map. The wearable system can accordingly calculate the objects that are inside of the FOV based on the user's position in the world map.

At block 1720, the wearable system can access contextual information associated with the object, the user, or the environment. The contextual information may be used to determine (or access) a visual representation of the aura corresponding to the object at block 1730. For example, a more urgent object may be associated with a larger and brighter aura while a less urgent object may be associated with a smaller or dimmer aura. As another example, the aura may represent a 2D projection of the object (onto the edge of the FOV) under the light conditions of the user's environment.

Optionally, at block 1740, the wearable system can render the visual representation of the aura based on the determination at block 1730. Examples of the visual representation of the aura have been described with reference to FIGS. 13-15B. In some cases, the wearable system may not render the visual representation of the aura. For example, if the object is within the FOV, the system may presume that the user can see the object and an aura may not be needed. If the system wishes to call the user's attention to an object in the FOV, the system may render an aura associated with the object (e.g., at least partially surrounding the object) to alert the user to the object. As another example, if the object is behind the user (e.g., in the user's FOR but not in the user's FOV), the wearable system may not render the visual representation because the user occludes the projection of the object onto an edge of the FOV. As another example and as described with reference to FIG. 14B, the object may be projected onto the edge of the FOV such that the position of the interior surface edge of the aura 1452 is co-linearly aligned with the imaging system of the AR system or the eye of the user. In this configuration, the user may not see the inside edge of the aura 1452.

Where the object is outside of the FOV but is inside of the FOR, the visual representation of the aura can be rendered as described with reference to block 1660 in FIG. 16.

Although the examples describe herein can provide auras for objects that are inside the FOV or inside the FOR but outside of the FOV, in various embodiments, the auras can also be provided for an object that is outside of the FOV and the FOR. For example, in a video game, a virtual enemy may be hiding behind a wall or approaching the user from a different room that is outside of the user's FOR. The wearable system can provide a visual aura on the edge of the user's FOV as a cue for the location of the virtual enemy. In certain implementations, the user can determine whether to turn off the visual auras for certain objects. For example, once a user has advanced to certain levels in a game, the user may turn off the visual aura features such that the wearable system will not provide a visual aura for an approaching enemy.

Additional Embodiments

In a 1st aspect, a method for providing an indication regarding presence of a virtual object in an augmented reality environment around a user, the method comprising: under control of an augmented reality (AR) system comprising computer hardware, the AR system configured to permit user interaction with virtual objects in a field of regard (FOR) of the user, the FOR comprising a portion of the environment around the user that is capable of being perceived by the user via the AR system: determining a group of virtual objects in the FOR of the user; determining a pose of the user; determining a field of view (FOV) of the user based at least partly on the pose of the user, the FOV comprising a portion of the FOR that is capable of being perceived at a given time by the user via the AR system; identifying a subgroup of the group of virtual objects that are located inside of the FOR of the user but outside of the FOV of the user; for at least some of the virtual objects in the subgroup of virtual objects: determining a location of the virtual object relative to the FOV of the user; determining, based at least in part on the location, a placement of a visual aura associated with the virtual object relative to the FOV of the user; and displaying the visual aura such that at least a portion of the visual aura is perceivable by the user to be on an edge of the FOV of the user. In some embodiments, the placement of the visual aura is also referred to as the visual representation of the visual aura.

In a 2nd aspect, the method of aspect 1, wherein the pose of the user comprises an eye pose of the user.

In a 3rd aspect, the method of any one of aspects 1-2, wherein the visual aura comprises a shape having a color.

In a 4th aspect, the method of aspect 3, wherein the shape comprises a rounded square.

In a 5th aspect, the method of any one of aspects 3-4, wherein the color of the visual aura indicates a type of the virtual object.

In a 6th aspect, the method of any one of aspects 1-5, wherein the placement of the aura comprises one or more of the following: brightness, position, or size.

In a 7th aspect, the method of aspect 6, wherein the brightness is based at least in part on proximity of the virtual object relative to the edge of the FOV.

In an 8th aspect, the method of any one of aspects 6-7, wherein the size indicates the proximity and/or urgency of the virtual objects.

In a 9th aspect, the method of any one of aspects 1-8, wherein the FOV of the user is determined based at least partly on an area of an AR display in the AR system.

In a 10th aspect, the method of any one of aspects 1-9, wherein the virtual objects comprise one or more of the following: an operating system virtual object or an application virtual object.

In an 11th aspect, the method of any one of aspects 1-10, wherein the AR system comprises a first AR display for a first eye of the user and a second AR display for a second eye of the user, and wherein displaying the visual aura on the edge of the FOV of the user comprises: displaying a first representation of the visual aura by the first AR display.

In a 12th aspect, the method of aspect 11, further comprising displaying a second representation of the visual aura by the second AR display, the second representation different from the first representation.

In a 13th aspect, the method of aspect 12, wherein the first representation of the visual aura and the second representation of the visual aura are rendered separately to each eye to match peripheral vision.

In a 14th aspect, the method of any one of aspects 12-13, wherein the first representation of the visual aura the second representation of the visual aura are rendered separately to each eye to reduce or avoid depth perception of the visual aura.

In a 15th aspect, the method of any one of aspects 1-14, further comprising: updating the subgroup of the group of virtual objects based at least partly on a change of the pose of the user; and updating the first or second representation of the visual aura based on the updated subgroup of the group of virtual objects.

In a 16th aspect, the method of any one of aspects 1-15, further comprising: determining that a virtual object in the subgroup of virtual objects has moved inside of the FOV of the user; and ceasing to display the visual aura associated with that virtual object.

In a 17th aspect, the method of any one of aspects 1-16, further comprising: determining that a virtual object in the FOV of the user has moved outside of the FOV of the user; and displaying a visual aura associated with that virtual object.

In an 18th aspect, a method for providing an indication of an object in an environment of a user, the method comprising: under control of an augmented reality (AR) system comprising an imaging system, the AR system configured to permit user interaction with virtual objects in a field of regard (FOR) of the user, the FOR comprising a portion of the environment around the user that is capable of being perceived by the user via the AR system: determining a group of objects in the FOR of the user; determining a field of view (FOV) of the user, the FOV comprising a portion of the FOR that is capable of being perceived at a given time by the user via the AR system; identify a subgroup of the group of objects that are located inside of the FOR of the user but outside of the FOV of the user; and displaying a visual aura for one or more of the objects in the subgroup of the group of objects such that at least a portion of the visual aura is perceivable in the FOV of the user.

In a 19th aspect, the method of aspect 18, wherein the FOV is determined based at least partly on a pose of the user.

In a 20th aspect, the method of aspect 19, wherein the pose of the user comprises at least one of the following: head pose, eye pose, or body pose.

In a 21st aspect, the method of any one of aspects 18-20, further comprising: determining a light condition of the environment of the user; simulating optical effects of the light condition for one or more virtual objects in the group of the objects; and determining a placement of the visual aura associated with the one or more virtual objects based at least partly on the simulated optical effects.

In a 22nd aspect, the method of aspect 21, wherein the environment is one or more of virtual environment or physical environment.

In a 23rd aspect, the method of any one of aspects 21-22, wherein the placement of the aura comprises one or more of the following: brightness, position, shape, or size.

In a 24th aspect, the method of any one of aspects 21-23, wherein determining a placement of the visual aura further comprises: identify a virtual object in the subgroup of the group of objects which are in the FOR of the user but are outside of the FOV of the user; and collinearly align the imaging system and at least one eye of the user with an interior edge of a visual aura associated with the virtual object.

In a 25th aspect, the method of any one of aspects 18-24, wherein the AR system comprises a first AR display for a first eye of the user and a second AR display for a second eye of the user, and wherein displaying the visual aura on the edge of the FOV of the user comprises: displaying a first representation of the visual aura by the first AR display.

In a 26th aspect, the method of aspect 25, further comprising displaying a second representation of the visual aura by the second AR display, the second representation different from the first representation.

In a 27th aspect, the method of aspect 26, wherein the first representation of the visual aura and the second representation of the visual aura are rendered separately to each eye to match peripheral vision.

In a 28th aspect, the method of any one of aspects 26-27, wherein the first representation of the visual aura the second representation of the visual aura are rendered separately to each eye to reduce or avoid depth perception of the visual aura.

In a 29th aspect, the method of any one of aspects 18-28, further comprising: updating the subgroup of the group of objects based at least partly on a change of the pose of the user; and updating the first or second representation of the visual aura based on the updated subgroup of the group of objects.

In a 30th aspect, an augmented reality (AR) system comprising computer hardware programmed to perform the method of any one of aspects 1-29.

In a 31st aspect, a system for providing an indication of an interactable object in a three-dimensional (3D) environment of a user, the system comprising: a display system of a wearable device configured to present a three-dimensional view to a user and permit a user interaction with objects in a field of regard (FOR) of a user, the FOR comprising a portion of the environment around the user that is capable of being perceived by the user via the display system; a sensor configured to acquire data associated with a pose of the user; and a hardware processor in communication with the sensor and the display system, the hardware processor programmed to: determine a pose of the user based on the data acquired by the sensor; determine a field of view (FOV) of the user based at least partly on the pose of the user, the FOV comprising a portion of the FOR that is capable of being perceived at a given time by the user via the display system; identify an interactable object located outside of the FOV of the user; access contextual information associated with the interactable object; determine a visual representation of an aura based on the contextual information; and render the visual representation of the aura such that at least a portion of the visual aura perceivable by the user is on an edge of the FOV of the user.

In a 32nd aspect, the system of aspect 1, wherein the display system comprises a first light field display for a first eye of the user and a second light field display for a second eye of the user, and wherein to render a visual representation of the aura, the hardware processor is programmed to: render a first visual representation of the aura by the first light field display at a first edge of a first FOV associated with the first eye; and render a second visual representation of the aura by the second light field display at a second edge of the second FOV associated with the second eye.

In a 33rd aspect, the system of aspect 32, wherein the first representation of the aura and the second representation of the aura are rendered separately for each eye to match the user's peripheral vision.

In a 34th aspect, the system of any one of aspects 31-33, wherein the contextual information comprises information associated with the user, the 3D environment, or characteristics of the interactable object.

In a 35th aspect, the system of aspect 34, wherein the information associated with the 3D environment comprises a light condition of the environment of the user, and wherein the placement of the aura is determined by simulating an optical effect of the interactable object under the light condition.

In a 36th aspect, the system of any one of aspects 31-35, wherein the hardware processor is further programmed to: detect a change in the pose of the user; determine an updated location of the interactable object in the 3D environment based on the change in the pose of the user; and update the visual representation of the aura based on the updated location of the interactable object.

In a 37th aspect, the system of aspect 36, wherein in response to a determination that the updated location is within the user's FOV, the hardware processor is programmed to determine the placement of the aura by collinearly aligning an interior edge of the aura with at least one eye of the user.

In a 38th aspect, the system of any one of aspects 31-37, wherein the visual representation of the aura comprising at least one of: a position, a shape, a color, a size, or a brightness.

In a 39th aspect, the system of aspect 8, wherein the size of the aura indicates at least one of: a proximity or an urgency of the interactable object.

In a 40th aspect, the system of any one of aspects 31-39, wherein the pose of the user comprises at least one of: a head pose or a direction of gaze.

In a 41st aspect, a method for providing an indication of an interactable object in a three-dimensional (3D) environment of a user, the method comprising: under control of a wearable device having a display system configured to present a three-dimensional (3D) view to a user and permit a user interaction with objects in a field of regard (FOR) of a user, the FOR comprising a portion of the environment around the user that is capable of being perceived by the user via the display system; a sensor configured to acquire data associated with a pose of the user; and a hardware processor in communication with the sensor and the display system: determining a field of view (FOV) of the user based at least partly on the pose of the user, the FOV comprising a portion of the FOR that is capable of being perceived at a given time by the user via the display system; identifying an interactable object located outside of the FOV of the user; accessing contextual information associated with the interactable object; determining a visual representation of an aura based on the contextual information; and rendering the visual representation of the aura such that at least a portion of the visual aura perceivable by the user is on an edge of the FOV of the user.

In a 42nd aspect, the method of aspect 41, further comprising: rendering a first visual representation of the aura at a first edge of a first FOV associated with a first eye of the user; and rendering a second visual representation of the aura at a second edge of the second FOV associated with a second eye of the user.

In a 43rd aspect, the method of aspect 42, wherein the first representation of the aura and the second representation of the aura are rendered separately for each eye to match the user's peripheral vision.

In a 44rd aspect, the method of any one of aspects 4-43, wherein the contextual information comprises information associated with the user, the 3D environment, or characteristics of the interactable object.

In a 45th aspect, the method of aspect 44, wherein the information associated with the 3D environment comprises a light condition of the environment of the user, and wherein the visual representation of the aura is determined by simulating an optical effect of the interactable object under the light condition.

In a 46th aspect, the method of aspect 45, further comprising: detecting a change in the pose of the user; determining an updated location of the interactable object in the 3D environment based on the change in the pose of the user; and updating the visual representation of the aura based on the updated location of the interactable object.

In a 47th aspect, the method of aspect 46, wherein in response to a determination that the updated location is within the user's FOV, collinearly aligning an interior edge of the aura with at least one eye of the user.

In a 48th aspect, the method of any one of aspects 46-47, wherein the visual representation of the aura comprising at least one of: a position, a shape, a color, a size, or a brightness.

In a 49th aspect, the method of aspect 48, wherein the size of the aura indicates at least one of: a proximity or an urgency of the interactable object.

In a 50th aspect, the method of any one of aspects 41-49, wherein the pose of the user comprises at least one of: a head pose or a direction of gaze.

Conclusion

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for providing an indication of a hidden interactable object in a three-dimensional (3D) environment of a user, the system comprising:
 a display system of a wearable device configured to present a three-dimensional view to a user and permit a user interaction with objects in a field of regard (FOR) of a user, the FOR comprising a portion of the environment around the user that is capable of being perceived by the user via the display system, wherein the wearable device is configured to be head mounted, and wherein the display system is coupled to the wearable device such that the display system moves in conjunction with movements of the head of the user, wherein the display system comprises a first light field display for a first eye of the user and a second light field display for a second eye of the user, and wherein the first and second light field displays are configured to render a visual representation of an aura;
 a sensor configured to acquire data associated with a pose of the user; and
 a hardware processor in communication with the sensor and the display system, the hardware processor programmed to:
  determine a pose of the user based on the data acquired by the sensor;
  determine a field of view (FOV) of the user through the display system based at least partly on the pose of the user, the FOV comprising a portion of the FOR that is capable of being perceived at a given time by the user via the display system;
  identify a hidden interactable object, wherein the hidden interactable object comprises a virtual object within the FOV of the user that the user cannot directly perceive via the display system;
  access contextual information associated with the hidden interactable object, wherein the contextual information comprises a location of the hidden interactable object in relation to the pose of the user;
  determine a visual representation of the aura associated with the hidden interactable object based on the contextual information that indicates the location of the hidden interactable object to the user, the visual representation comprising:
   a first visual representation of the aura associated with a first FOV of the first eye; and
   a second visual representation of the aura associated with a second FOV of the second eye; and
  render the visual representation of the aura associated with the hidden interactable object such that at least a portion of the visual aura perceivable by the user is on an edge of the FOV of the user by:
   render the visual representation of the aura associated with the hidden interactable object such that at least a portion of the visual aura perceivable by the user is on an edge of the FOV of the user by:
   rendering the first visual representation of the aura by the first light field display at a first edge of the first FOV; and
   rendering the second visual representation of the aura by the second light field display at a second edge of the second FOV, wherein the second visual representation does not match stereoscopically with the first visual representation and is rendered at a depth that is different than other virtual content rendered by the display system.

2. The system of claim 1, wherein the first visual representation of the aura and the second visual representation of the aura are rendered separately for each eye to match the user's peripheral vision.

3. The system of claim 1, wherein the contextual information comprises information associated with the user, the 3D environment, or characteristics of the interactable object.

4. The system of claim 3, wherein the information associated with the 3D environment comprises a light condition of the environment of the user as perceived by the user through the display system, and wherein the placement of the aura is determined by simulating an optical effect of the interactable object under the light condition.

5. The system of claim 1, wherein the hardware processor is further programmed to:
 detect a change in the pose of the user;

determine an updated location of the interactable object in the 3D environment based on the change in the pose of the user; and update the visual representation of the aura based on the updated location of the interactable object.

6. The system of claim 5, wherein in response to a determination that the updated location is within the user's FOV, the hardware processor is programmed to determine the placement of the aura by collinearly aligning an interior edge of the aura with at least one eye of the user.

7. The system of claim 1, wherein the visual representation of the aura comprising at least one of: a position, a shape, a color, a size, or a brightness.

8. The system of claim 7, wherein the size of the aura indicates at least one of: a proximity or an urgency of the interactable object.

9. The system of claim 1, wherein the pose of the user comprises at least one of: a head pose or a direction of gaze.

10. The system of claim 1, wherein the hidden interactable object comprises an object occluded from a user's view.

11. The system of claim 1, wherein the hidden interactable object comprises a virtual object that becomes perceivable in response to a user interface operation.

12. The system of claim 1, wherein the hidden interactable object comprises a virtual element of a physical object.

13. The system of claim 1, wherein the hardware processor is programmed to:
receive a user input associated with the hidden interactable object; and
render the hidden interactable object in response to the user input.

14. The system of claim 13, wherein the user input comprises actuation of a user input device.

15. A method for providing an indication of an interactable object in a three-dimensional (3D) environment of a user, the method comprising:
under control of a wearable device having a display system configured to present a three-dimensional (3D) view to a user and permit a user interaction with objects in a field of regard (FOR) of a user, the FOR comprising a portion of the environment around the user that is capable of being perceived by the user via the display system, wherein the wearable device is configured to be head mounted and wherein the display system is coupled to the wearable device such that the display system moves in conjunction with movements of the head of the user; a sensor configured to acquire data associated with a pose of the user; and a hardware processor in communication with the sensor and the display system, wherein the display system comprises a first light field display for a first eye of the user and a second light field display for a second eye of the user, and wherein the first and second light field displays are configured to render a visual representation of an aura:
determining a field of view (FOV) of the user through the display system based at least partly on the pose of the user, the FOV comprising a portion of the FOR that is capable of being perceived at a given time by the user via the display system;
identifying a hidden interactable object, wherein the hidden interactable object comprises a virtual object within the FOV of the user that the user cannot directly perceive via the display system;
accessing contextual information associated with the hidden interactable object, wherein the contextual information comprises a location of the hidden interactable object in relation to the pose of the user;
determining a first visual representation of a first aura associated with a FOV of the first eye based on the contextual information that indicates the location of the hidden interactable object to the user;
determining a second visual representation of a second aura associated with a FOV of the second eye based on the contextual information that indicates the location of the hidden interactable object to the user, wherein the first visual representation of the aura is different from the second visual representation of the aura;
rendering the first visual representation of the first aura by the first light field display at a first edge of a first FOV associated with the first eye; and
rendering the second visual representation of the second aura by the second light field display at a second edge of the second FOV associated with the second eye.

16. The method of claim 15, wherein the contextual information comprises information associated with the user, the 3D environment, or characteristics of the interactable object.

17. The method of claim 16, wherein the information associated with the 3D environment comprises a light condition of the environment of the user, and wherein the visual representation of the aura is determined by simulating an optical effect of the interactable object under the light condition.

18. The method of claim 17, further comprising:
detecting a change in the pose of the user;
determining an updated location of the interactable object in the 3D environment based on the change in the pose of the user; and
updating the first visual representation of the first aura or the second visual representation of the second aura based on the updated location of the interactable object.

19. The method of claim 18, wherein in response to a determination that the updated location is within the user's FOV, collinearly aligning an interior edge of the aura with at least one eye of the user.

20. The method of claim 18, wherein the first or second visual representation comprises at least one of: a position, a shape, a color, a size, or a brightness.

21. The method of claim 20, wherein the size of the first or second aura indicates at least one of: a proximity or an urgency of the interactable object.

22. The method of claim 15, wherein the pose of the user comprises at least one of: a head pose or a direction of gaze.

23. The method of claim 15, wherein the hidden interactable object comprises an object occluded from a user's view.

24. The method of claim 15, wherein the hidden interactable object comprises a virtual object that becomes perceivable in response to a user interface operation.

25. The system of claim 15, wherein the hidden interactable object comprises a virtual element of a physical object.

26. The method of claim 15 comprising:
receiving a user input associated with the hidden interactable object; and
rendering the hidden interactable object in response to the user input.

27. The method of claim 26, wherein the user input comprises actuation of a user input device.

* * * * *

(12) EX PARTE REEXAMINATION CERTIFICATE (12652nd)
United States Patent
Naples et al.

(10) Number: US 10,838,484 C1
(45) Certificate Issued: Jul. 16, 2024

(54) VISUAL AURA AROUND FIELD OF VIEW

(71) Applicant: Magic Leap, Inc., Plantation, FL (US)

(72) Inventors: Alysha Naples, Ft. Lauderdale, FL (US); Jonathan Lawrence Mann, Seattle, WA (US); Paul Armistead Hoover, Bothell, WA (US)

(73) Assignee: MAGIC LEAP, INC., Plantation, FL (US)

Reexamination Request:
No. 90/019,207, May 10, 2023

Reexamination Certificate for:
Patent No.: 10,838,484
Issued: Nov. 17, 2020
Appl. No.: 15/491,571
Filed: Apr. 19, 2017

Related U.S. Application Data

(60) Provisional application No. 62/325,685, filed on Apr. 21, 2016.

(51) Int. Cl.
*G06F 3/01* (2006.01)
*G06F 3/04815* (2022.01)
*G06V 20/20* (2022.01)
*G06V 40/18* (2022.01)

(52) U.S. Cl.
CPC .............. *G06F 3/011* (2013.01); *G06F 3/012* (2013.01); *G06F 3/013* (2013.01); *G06F 3/04815* (2013.01); *G06V 20/20* (2022.01); *G06V 40/193* (2022.01)

(58) Field of Classification Search
None
See application file for complete search history.

(56) References Cited

To view the complete listing of prior art documents cited during the proceeding for Reexamination Control Number 90/019,207, please refer to the USPTO's Patent Electronic System.

*Primary Examiner* — Eric B. Kiss

(57) ABSTRACT

A wearable device can have a field of view through which a user can perceive real or virtual objects. The device can display a visual aura representing contextual information associated with an object that is outside the user's field of view. The visual aura can be displayed near an edge of the field of view and can dynamically change as the contextual information associated with the object changes, e.g., the relative position of the object and the user (or the user's field of view) changes.

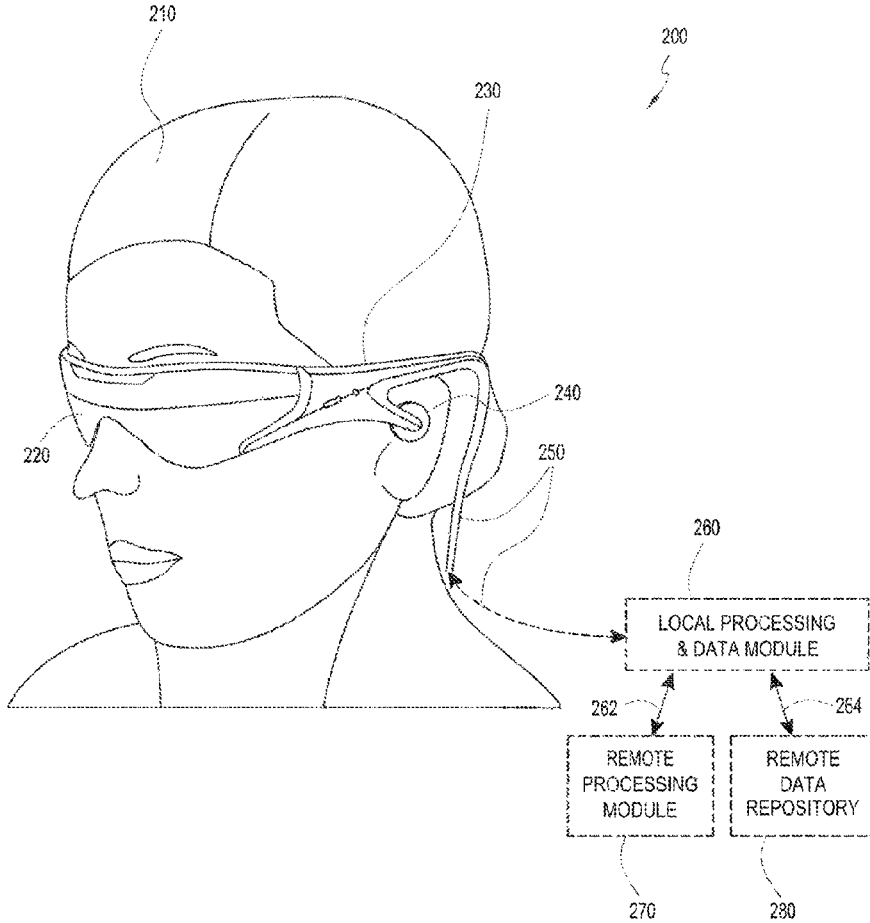

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11, 15 and 24 are determined to be patentable as amended.

Claims 2-10, 12-14, 16-23 and 25-27, dependent on an amended claim, are determined to be patentable.

New claims 28-31 are added and determined to be patentable.

1. A system for providing an indication of a hidden interactable object in a three-dimensional (3D) environment of a user, the system comprising:
   a display system of a wearable device configured to present a three-dimensional view to a user and permit a user interaction with objects in a field of regard (FOR) of a user, the FOR comprising a portion of the environment around the user that is capable of being perceived by the user via the display system, wherein the wearable device is configured to be head mounted, and wherein the display system is coupled to the wearable device such that the display system moves in conjunction with movements of the head of the user, wherein the display system comprises a first light field display for a first eye of the user and a second light field display for a second eye of the user, and wherein the first and second light field displays are configured to render a visual representation of an aura;
   a sensor configured to acquire data associated with a pose of the user; and
   a hardware processor in communication with the sensor and the display system, the hardware processor programmed to:
   determine a pose of the user based on the data acquired by the sensor;
   determine a field of view (FOV) of the user through the display system based at least partly on the pose of the user, the FOV comprising a portion of the FOR that is capable of being perceived at a given time by the user via the display system;
   identify a hidden interactable object, wherein the hidden interactable object comprises a virtual object within the FOV of the user that the user cannot directly perceive via the display system *because the virtual object is obscured from the user by an obscuring object*;
   access contextual information associated with the hidden interactable object, wherein the contextual information comprises a location of the hidden interactable object in relation to the pose of the user;
   determine a visual representation of the aura associated with the hidden interactable object based on the contextual information that indicates the location of the hidden interactable object to the user, the visual representation comprising:
   *a first visual representation of the aura associated with a first FOV of the first eye; and*
   *a second visual representation of the aura associated with a second FOV of the second eye; and*
   render the visual representation of the aura associated with the hidden interactable object such that at least a portion of the visual aura perceivable by the user is on an edge of the FOV of the user by:
   [render the visual representation of the aura associated with the hidden interactable object such that at least a portion of the visual aura perceivable by the user is on an edge of the FOV of the user by:]
   *rendering the first visual representation of the aura by the first light field display at a first edge of the first FOV; and*
   *rendering the second visual representation of the aura by the second light field display at a second edge of the second FOV, wherein the second visual representation does not match stereoscopically with the first visual representation and is rendered at a depth that is different than other virtual content rendered by the display system.*

11. The system of claim 1, wherein the [hidden interactable object comprises a] virtual object [that] *becomes* perceivable in response to a user interface operation.

15. A method for providing an indication of an interactable object in a three-dimensional (3D) environment of a user, the method comprising:
   under control of a wearable device having a display system configured to present a three-dimensional (3D) view to a user and permit a user interaction with objects in a field of regard (FOR) of a user, the FOR comprising a portion of the environment around the user that is capable of being perceived by the user via the display system, wherein the wearable device is configured to be head mounted and wherein the display system is coupled to the wearable device such that the display system moves in conjunction with movements of the head of the user; a sensor configured to acquire data associated with a pose of the user; and a hardware processor in communication with the sensor and the display system, wherein the display system comprises a first light field display for a first eye of the user and a second light field display for a second eye of the user, and wherein the first and second light field displays are configured to render a visual representation of an aura:
   determining a field of view (FOV) of the user through the display system based at least partly on the pose of the user, the FOV comprising a portion of the FOR that is capable of being perceived at a given time by the user via the display system;
   identifying a hidden interactable object, wherein the hidden interactable object comprises a virtual object within the FOV of the user that the user cannot directly perceive via the display system *because the virtual object is obscured from the user by an obscuring object*;
   accessing contextual information associated with the hidden interactable object, wherein the contextual information comprises a location of the hidden interactable object in relation to the pose of the user;
   *determining a first visual representation of a first aura associated with a FOV of the first eye based on the contextual information that indicates the location of the hidden interactable object to the user;*
   *determining a second visual representation of a second aura associated with a FOV of the second eye based on the contextual information that indicates the location of* the hidden interactable object to the user, wherein the first visual representation of the aura is different from the second visual representation of the aura;

rendering the first visual representation of the first aura by the first light field display at a first edge of a first FOV associated with the first eye; and rendering the second visual representation of the second aura by the second light field display at a second edge of the second FOV associated with the second eye.

24. The method of claim 15, wherein the [hidden interactable object comprises a] virtual object [that] becomes perceivable in response to a user interface operation.

*28. The system of claim 1, wherein the obscuring object is a physical obscuring object.*

*29. The system of claim 1, wherein the obscuring object is a virtual obscuring object.*

*30. The method of claim 15, wherein the obscuring object is a physical obscuring object.*

*31. The method of claim 15, wherein the obscuring object is a virtual obscuring object.*

\* \* \* \* \*